United States Patent
Hayes-Pankhurst et al.

(10) Patent No.: US 12,215,013 B2
(45) Date of Patent: Feb. 4, 2025

(54) BEVERAGE DISPENSER HEAD FOR MIXING CONCENTRATE, DILUENT AND ADDITIVE

(71) Applicant: QUANTEX ARC LIMITED, London (GB)

(72) Inventors: Richard Paul Hayes-Pankhurst, London (GB); Jonathan Edward Ford, Cambridge (GB)

(73) Assignee: QUANTEX ARC LIMITED, London (GB)

( * ) Notice: Subject to any disclaimer, the term of this patent is extended or adjusted under 35 U.S.C. 154(b) by 0 days.

(21) Appl. No.: 18/392,994

(22) Filed: Dec. 21, 2023

(65) Prior Publication Data

US 2024/0124290 A1    Apr. 18, 2024

Related U.S. Application Data

(63) Continuation of application No. 18/086,156, filed on Dec. 21, 2022, now Pat. No. 11,858,797, which is a
(Continued)

(30) Foreign Application Priority Data

Sep. 3, 2018   (GB) ..................................... 1814262

(51) Int. Cl.
    *B67D 1/00*    (2006.01)
    *A23L 2/40*    (2006.01)
    (Continued)

(52) U.S. Cl.
    CPC .............. *B67D 1/0044* (2013.01); *A23L 2/40* (2013.01); *A23L 2/54* (2013.01); *B01F 23/236* (2022.01);
    (Continued)

(58) Field of Classification Search
    CPC .. B67D 1/0044; B67D 1/0031; B67D 1/0058; B67D 1/07; B67D 1/0888; B67D 1/127;
    (Continued)

(56) References Cited

U.S. PATENT DOCUMENTS

| 4,096,971 A | 6/1978 | Kuckens |
| 4,194,650 A | 3/1980 | Nottke et al. |

(Continued)

FOREIGN PATENT DOCUMENTS

| CN | 1308911 A | 8/2001 |
| CN | 104338481 A | 2/2015 |

(Continued)

OTHER PUBLICATIONS

International Preliminary Report on Patentability in International Appln. No. PCT/EP2019/073495, dated Mar. 18, 2021, 8 pages.
(Continued)

*Primary Examiner* — Donnell A Long
(74) *Attorney, Agent, or Firm* — Fish & Richardson P.C.

(57) ABSTRACT

A dispenser head for in-line mixing and dispensing of beverages, which may be carbonated or nitrogenated. The dispenser head comprising a pump, a dilution mechanism, an additive mechanism, and outlet nozzle and optionally a regulation system. In use, the pump can pump concentrate liquid for the liquid product from a concentrate source to the dilution mechanism; the dilution mechanism can receive diluent liquid suitable for the liquid product from a diluent source, operable to mix the diluent liquid and the concentrate liquid and provide diluted concentrate liquid; and the additive mechanism can receive additive fluid for the liquid product from an additive source, to combine the diluted concentrate liquid and the additive fluid. The regulation system comprises a pump regulator means for regulating the quantity of concentrate liquid pumped into the dilution
(Continued)

mechanism within the dispense period; a diluent quantity regulator means for regulating the flow of diluent liquid into the dilution mechanism; and an additive quantity regulator means for regulating the flow of additive fluid into the additive mechanism. Preferably, the dispenser head is a unitary device, which may be supplied attached to a vessel containing the concentrate.

21 Claims, 9 Drawing Sheets

Related U.S. Application Data continuation of application No. 17/273,289, filed as application No. PCT/EP2019/073495 on Sep. 3, 2019, now Pat. No. 11,542,142.

(51) Int. Cl.
| | | |
|---|---|---|
| *A23L 2/54* | (2006.01) | |
| *B01F 23/236* | (2022.01) | |
| *B01F 23/40* | (2022.01) | |
| *B01F 25/30* | (2022.01) | |
| B01F 23/237 | (2022.01) | |
| B01F 101/14 | (2022.01) | |
| B67D 1/07 | (2006.01) | |

(52) U.S. Cl.
CPC ............ *B01F 23/405* (2022.01); *B01F 25/30* (2022.01); *B67D 1/0031* (2013.01); *B67D 1/0058* (2013.01); *A23V 2002/00* (2013.01); B01F 23/237621 (2022.01); B01F 2101/14 (2022.01); B67D 1/07 (2013.01)

(58) Field of Classification Search
CPC .. B67D 1/0027; B67D 1/0028; B67D 1/0034; B67D 1/0037; B67D 1/0039; B67D 1/0046; B67D 1/10; B67D 1/1231; B67D 1/1277; B67D 1/0081; B67D 1/12; B67D 1/0021; B67D 1/0022; B67D 1/025; B67D 1/0406; A23L 2/40; A23L 2/54; A23L 2/00; B01F 23/236; B01F 23/405; B01F 25/30; B01F 23/237621; B01F 2101/14; B01F 23/40; A23V 2002/00
See application file for complete search history.

(56) References Cited

U.S. PATENT DOCUMENTS

| | | | |
|---|---|---|---|
| 4,350,503 A | 9/1982 | Skoli et al. | |
| 4,354,806 A | 10/1982 | McMillin et al. | |
| 4,560,089 A | 12/1985 | McMillin et al. | |
| 4,609,014 A | 9/1986 | Jurjevic et al. | |
| 4,624,395 A * | 11/1986 | Baron .................. | A47J 31/401 |
| | | | D7/308 |
| 6,092,693 A | 7/2000 | Powell | |
| 6,260,477 B1 | 7/2001 | Tuyls et al. | |
| 7,222,643 B2 | 5/2007 | Bailey | |
| 7,225,829 B2 | 6/2007 | Bailey | |
| 8,960,500 B2 | 2/2015 | van Opstal et al. | |
| 9,850,118 B2 * | 12/2017 | Deo ...................... | B67D 1/108 |
| 2006/0147601 A1 | 7/2006 | Scullion et al. | |
| 2007/0114244 A1 | 5/2007 | Gatipon et al. | |
| 2008/0073376 A1 | 3/2008 | Gist et al. | |
| 2009/0145926 A1 | 6/2009 | Klopfenstein et al. | |
| 2010/0089948 A1 | 4/2010 | Ziesel et al. | |
| 2017/0144877 A1 | 5/2017 | Rider et al. | |
| 2019/0292032 A1 | 9/2019 | Lazatin et al. | |

FOREIGN PATENT DOCUMENTS

| | | |
|---|---|---|
| CN | 105209759 A | 12/2015 |
| DE | 2211754 | 9/1973 |
| EP | 1460042 | 9/2004 |
| EP | 2383553 | 11/2011 |
| EP | 2889262 | 7/2015 |
| GB | 2507029 | 4/2014 |
| GB | 2551663 | 12/2017 |
| JP | 2002515238 A | 5/2002 |
| JP | 2009514746 A | 4/2009 |
| JP | 2015530322 A | 10/2015 |
| JP | 2017513775 A | 6/2017 |
| WO | WO 2002026614 | 4/2002 |
| WO | WO 2002079073 | 10/2002 |
| WO | WO 2006027548 | 3/2006 |
| WO | WO 2010045085 | 4/2010 |
| WO | WO 2010122299 | 10/2010 |
| WO | WO 2013050488 | 4/2013 |
| WO | WO 2013050491 | 4/2013 |
| WO | WO 2013117486 | 8/2013 |
| WO | WO 2014036117 | 3/2014 |
| WO | WO 2014060418 | 4/2014 |
| WO | WO 2014135563 | 9/2014 |

OTHER PUBLICATIONS

International Search Report and Written Opinion in International Appln. No. PCT/EP2019/073495, dated Oct. 12, 2019, 11 pages.

* cited by examiner

BEVERAGE DISPENSER HEAD FOR MIXING CONCENTRATE, DILUENT AND ADDITIVE

CROSS-REFERENCE TO RELATED APPLICATIONS

This application is a continuation of U.S. patent application Ser. No. 18/086,156, filed on Dec. 21, 2021, which is continuation of U.S. patent application Ser. No. 17/273,289, filed on Mar. 3, 2021, now U.S. Pat. No. 11,542,142, which is a National Stage Application under 35 USC § 371 and claims the benefit of International Patent Application No. PCT/EP2019/073495, filed on Sep. 3, 2019, which claims the benefit of United Kingdom Patent Application No. 1814262.0, filed on Sep. 3, 2018, which are incorporated herein by reference in their entirety.

This disclosure relates generally to a dispenser head, in particular, although not exclusively, to a beverage dispenser head for in-line dispensing of beverages. The dispenser head of the present invention is suitable for dispensing effervescible liquids, such as carbonated or nitrogenated beverages, foodstuffs or soaps, and still liquids such as fruit juice.

International patent application publication number WO2014135563 discloses a pump comprising a rotor that can rotate within a housing to pump a first liquid from a first inlet to an outlet, and a second inlet for introducing a second fluid into the outlet to mix with the first fluid. For example, the first liquid may be a beverage concentrate, dairy product, alcoholic beverage, liquid medicine or detergent from a container, and the second liquid may be still, or carbonated or nitrogenated water to dilute, carbonate, nitrogenate or foam the first liquid.

GB 2 507 029 discloses a liquid delivery system comprising a pump mechanism having an inlet adaptor for connecting the pump to a container of liquid concentrate. The pump mechanism comprises a rotor within a pump housing, the rotor including a radially depressed surface area for conveying relatively precise quanta of the concentrate from the inlet to an outlet as the rotor rotates. A seal located between the inlet is urged against the rotor surface to prevent fluid passing from the outlet to the inlet and expel liquid through the outlet as the radially depressed surface area rotates against the seal. The system includes a first inlet tube downstream from the pump mechanism for introducing diluent liquid such as water to dilute the pumped concentrate, and a second inlet tube downstream from the first inlet tube for introducing gas such as carbon dioxide into the diluted concentrate to provide a carbonated liquid mixture.

There is a need for an improved dispenser head and method for producing and dispensing liquid product on demand (particularly but not exclusively effervescible beverages such as carbonated or nitrogenated beverages or foodstuffs). The dispenser head may also be arranged to mix fluids to produce a liquid to be dispensed or required composition. Suitably, such a dispenser head will be relatively efficient, rapid and hygienic, and be able to dispense liquids with a relatively precise composition.

According to a first aspect there is provided a dispenser head comprising a pump, a dilution mechanism, an additive mechanism and an outlet nozzle, the pump comprising an attachment mechanism including a duct, a rotor rotatably mounted within a pump housing, the pump housing comprising a pump inlet and a pump outlet, wherein the duct is in fluid flow communication with the pump inlet and the pump outlet is in fluid flow communication with the dilution mechanism, the dilution mechanism comprising a dilution housing comprising a dilution chamber and a diluent duct comprising a diluent inlet and an orifice, the diluent duct being in fluid flow communication with the diluent chamber by means of the orifice and the pump outlet opening into the diluent chamber, the diluent mechanism being connected to the additive mechanism via a valve, the additive mechanism comprising an additive housing comprising an additive chamber, an additive inlet in fluid flow communication with the additive chamber, and the additive chamber being in fluid flow communication with the outlet nozzle.

Preferably the valve connecting the diluent mechanism to the additive mechanism is a one-way valve.

The dispenser head of the present invention can be used for producing a quantity of fluid, which may comprise an effervescible liquid, such as a foamed foodstuff or a carbonated beverage. The pump, dilution mechanism, and additive mechanism are suitably cooperatively configured such that in use the pump mechanism can pump concentrate liquid for the liquid product from a concentrate source to the dilution mechanism; the dilution mechanism can receive diluent liquid suitable for the liquid product from a diluent source, operable to mix the diluent liquid and the concentrate liquid and provide diluted concentrate liquid; and the additive mechanism can receive additive fluid for the liquid product from an additive source, operable to combine the diluted concentrate liquid and the additive fluid. The additive fluid may be, comprise or consist essentially of a liquid, particularly but not exclusively an effervescible liquid, or a gas. The dispenser head of the present invention may further comprise a regulation system comprising a pump regulator means for regulating the flow of concentrate liquid pumped into the dilution mechanism; a diluent quantity regulator means for regulating the flow of diluent liquid that flows into the dilution mechanism; and an additive quantity regulator means for regulating the flow of additive fluid that flows into the additive mechanism.

Suitably the dispenser head of the present invention may be used in an in-line dispenser assembly to provide dispensed liquids on demand. An in-line dispenser assembly according to a second aspect of the present invention may comprise a dispenser head of the present invention and a supplemental fluid supply system for supplying diluent liquid through a diluent channel and additive fluid through an additive channel; configured such that the dilution mechanism can be connected to the diluent channel for the diluent liquid to flow from the diluent channel into the dilution mechanism, and the additive mechanism can be connected to the additive channel for the additive fluid to flow from the additive channel to the additive mechanism.

According to a third aspect, the present invention provides a method of dispensing an effervescent liquid using a dispenser head according to the present invention, the method including: determining a quantity of concentrate liquid and a quantity of additive liquid to be combined and dispensed as constituents of the liquid product, the additive liquid being effervescible liquid; providing a concentrate source connected to the pump such that the pump can pump concentrate liquid from the concentrate source to the dilution mechanism; activating the pump to pump the quantity of concentrate liquid into the additive mechanism and putting an additive source into fluid communication with the additive mechanism to allow the quantity of additive liquid to flow into the additive mechanism; and dispensing the quantity of liquid product comprising the quantity of the concentrate liquid and the quantity of additive liquid.

According to a fourth aspect, the present invention provides a method of dispensing a still liquid product using a dispenser head according to the present invention, the method including: determining a quantity of concentrate liquid and a quantity of diluent liquid to be combined and dispensed as constituents of the liquid product; providing a concentrate source connected to the pump such that the pump can pump concentrate liquid from the concentrate source to the dilution mechanism; activating the pump to pump the quantity of concentrate liquid into the dilution mechanism and putting a diluent source into fluid communication with the dilution mechanism to allow the quantity of diluent liquid to flow into the dilution mechanism; and dispensing the liquid product comprising the concentrate liquid and the diluent liquid.

According to a fifth aspect there is provided a method of cleaning a dispenser head according to the present invention, the method including: putting the additive mechanism in fluid communication with a source of cleaning fluid at sufficient pressure for the cleaning fluid to flow into the dispenser head, and then putting the additive mechanism out of fluid communication with the source of cleaning fluid and removing the cleaning fluid from the dispenser head.

Various dispenser head and in-line dispenser head arrangements, as well as methods of dispensing liquid product and cleaning dispenser systems, are envisaged by this disclosure, non-limiting and non-exhaustive examples of which are described below.

The dispenser head of the present invention may be provided in assembled form as in use, in kit form, or in partially assembled form. In a preferred embodiment, the pump, dilution mechanism, additive mechanism and outlet nozzle of the dispenser head are provided as a unitary construction. Suitably, the unitary construction comprises a single plastic device made by any suitable method, for example, by injection moulding.

Suitably, the concentrate source may comprise a vessel for containing the concentrate liquid, which can be connected to the pump by means of the attachment mechanism such that the concentrate liquid can flow from the vessel into the pump in response to operation of the pump mechanism.

The dispenser head may be attachable to the vessel of concentrate liquid by means of coupling mechanism that can be released and operable to detach the vessel from the dispenser head. Preferably, the dispenser head is fixedly attached to the vessel of concentrate liquid such that the dispenser system may be disposed of once the vessel has been emptied of its concentrate contents.

In some example arrangements, the pump may be configured for pumping the concentrate liquid as a series of discrete quanta of the concentrate liquid, or as a continuous flow of concentrate liquid. The mean pumping rate of the concentrate liquid may be predetermined or controllable by a regulation means.

In some example arrangements, the dilution mechanism may be configured to promote the rapid dilution of the concentrate liquid with the diluent liquid and thus reduce the viscosity and/or the Brix value of the concentrate liquid to be combined with effervescible additive liquid by the additive mechanism, whilst reducing or substantially avoiding premature or excessive effervescence of the effervescible additive liquid.

In use, the dilution chamber can receive the pumped concentrate liquid from the pump, and the diluent duct can convey the diluent liquid from the diluent source into the dilution chamber. The dilution mechanism may be configured such that the concentrate liquid can mix with the diluent liquid within the dilution chamber to produce the diluted concentrate liquid. In some cases, there is no need to add diluent liquid to the concentrate liquid. In which case, the undiluted concentrate passes from the pump through the dilution mechanism and then into the additive mechanism undiluted. The diluted or undiluted concentrate liquid flows from the dilution chamber to the additive mechanism. The dispenser head (or more specifically, the dilution mechanism or the additive mechanism) comprises a flow regulator means for allowing liquid to flow from the dilution chamber to the additive chamber. Preferably the flow regulator means is one-way, thereby allowing liquid to flow from the dilution chamber to the additive chamber but preventing the flow of fluid from the additive chamber into the dilution chamber.

The diluent liquid can flow into the dilution chamber through the diluent orifice, the outlet area of the diluent orifice being sufficiently small to produce a jet of diluent liquid for promoting mixing with the concentrate liquid. In other words, the cross-sectional area of the diluent orifice may be sufficiently smaller than the mean cross-sectional area of the rest the diluent duct such that the velocity at which the diluent liquid is introduced into the dilution chamber is substantially greater than the mean velocity at which the diluent liquid flows through the rest of the diluent duct. Injecting the diluent liquid into the dilution chamber, and thus into concentrate liquid within the dilution chamber, at relatively high velocity may have the aspect of promoting relatively rapid mixing of the diluent liquid and the concentrate liquid.

If the area of the diluent orifice and the pressure of the diluent liquid are known (for example, if the pressure of the diluent liquid is controlled by a pressure regulator), then the quantity of the diluent liquid introduced into the dilution chamber can be determined and controlled by controlling the period of time over which the diluent liquid is allowed to flow into the dilution chamber. For example, a diluent shut-off valve may be controlled to allow or block the flow of the diluent liquid, by putting the shut-off valve into an open or closed state, respectively.

In some example arrangements, the diluent fluid may be water supplied from a mains water source.

In a preferred embodiment the diluent orifice is upstream of the pump outlet.

It may be desirable that concentrate liquid is prevented from entering the mains water supply, or other source of diluent fluid. Furthermore, it may be desirable that the concentrate liquid (whether diluted or not) is prevented from entering the source of additive fluid such as carbonated water or nitrogenated liquid (in some examples, the concentrate liquid may have a high sugar content, or Brix value, and/or a high fat content and be capable of promoting biological growth). In certain circumstances, there may be a legal requirement not to contaminate the mains water supply, and hygienic reasons not to contaminate the additive fluid supply. In addition, it may be undesirable for water from a mains supply, or carbonated water, to enter the source container of the concentrate liquid, to avoid contamination or premature partial dilution of the concentrate liquid, which may make it difficult or impossible to subsequently achieve a precise dilution ratio in the dispensed liquid. In view of these points, the flow of the concentrate liquid may need to be switched off before the diluent supply is switched off in order to flush at least the dilution chamber and ensure that no concentrate liquid, or diluted concentrate, or subsequently mixed liquid passes back through the diluent orifice. The diluted concentrate and/or additive liquid, having been combined and mixed, exits downstream from (below) and not in contact with the exit of the additive liquid; and additionally, the additive liquid may pass a washer-type check valve so that mixed liquid product cannot re-enter the duct supplying the additive liquid. The concentrate liquid may be introduced into a zone of the additive chamber that is at a lower pressure than the supply pressure of the diluted or undiluted concentrate liquid to ensure that the additive liquid does not force the diluted or undiluted concentrate up into the dilution chamber, or up through the diluent orifice.

In some example arrangements, in which water is introduced into the dispenser head from the mains supply, it may be desirable to keep the mains water pressure within a regulated standard range. Suitably, a dispenser head according to the present invention is suitable for receiving water at a pressure of about 150 kPA (1.5 bar). Since many territories provide mains water at least at this pressure and it may be substantially easier to regulate the pressure down (that is, to reduce the pressure) than to introduce a water pump into the system to increase the pressure. For example, if diluent water is known to be at a pressure of about 150 kPa, then the velocity of the water passing through a diluent orifice having a known area can be determined.

If the flow rate of the diluent is substantially constant, then the quantity of diluent mixed with the concentrate liquid (in other words, the ratio of the diluent liquid to the concentrate liquid) can be determined and regulated by controlling the period of time over which the diluent water is permitted to flow into the dilution chamber. For example, if diluent water (or other liquid) passes through the restricted orifice at about 20 ml/s (millilitres per second) and the desired dilution ratio is 2:1, then the pump mechanism needs to deliver concentrate liquid at a rate of about 6.6 ml/s (that is, 20 ml/s divided by 3) and so the total combined flow rate will be about 26.6 ml/s. If 200 ml of beverage is to be dispensed into a glass, for example, then the time required will be about 7.5 s (that is, 200 ml divided by 26.6 ml/s). In another example, in which a concentrate liquid needs to be diluted in a ratio of 4:1 (diluent to concentrate liquid), then the pump mechanism needs to deliver about 4.0 ml/s (that is, 20 ml divided by 5) of concentrate liquid and the total combined flow rate will be about 24 ml/s and the time for filling the 200 ml glass would be 8.33 s (that is 200 ml divided by 24 ml/s). Users may consider dispensing periods of these magnitudes to be convenient and sufficiently short. However, in examples where a concentrate liquid needs to be diluted in higher ratios, say a 24:1 dilution ratio, then the pump mechanism needs to deliver concentrate at a flow rate of about 0.8 ml/s (that is, 20 ml/s divided by 25), yielding a dispensing period of about 9.6 s, which may be considered to be a relatively long time for dispensing a glass of the beverage. An example way of reducing the dispensing time where the dilution ratio needs to be relatively high may be to use a dispenser system in which the restricted orifice through which the diluent liquid enters the dilution chamber has a larger area.

A dispenser head according to the present invention may include an RFID means, or other suitable data storage and indication means, for indicating the magnitude of the diluent orifice and/or other data regarding the dispenser head; such a data indication means may be capable of communicating with a regulation system and/or with a pump driver mechanism. Example data indication means may be capable of communicating other operating parameters for operating the dispenser head, or for modifying parameters for supplying concentrate liquid, and/or diluent liquid, and/or additive fluid to the dispenser head.

The pump may comprise a seal member capable of bearing against the rotor operable to prevent concentrate liquid from passing from the pump outlet to the pump inlet, and to expel concentrate liquid into the pump outlet. The seal member may be a diaphragm seal, or membrane that is a sufficiently thin and flexible portion of the pump housing. The pump and the diluent duct may be cooperatively configured such that pressure of diluent liquid within the diluent duct can be transmitted onto the rotor via the seal member. For example, the diluent duct may be configured such that diluent liquid can flow against a rear side of the seal member (that is, the side of the seal member opposite the side that will contact the rotor in use) and the pressure of the diluent liquid may be sufficiently great to urge the seal member against the rotating rotor with sufficient force to prevent concentrate liquid from passing between the surfaces of the rotor and the pump housing. For example, where the diluent liquid is mains water, a pressure of 150 kPA may be suitable for applying to a diaphragm seal to force the diaphragm seal against the rotor. Additionally, the pressure drop across the diluent orifice means that the diluent pressure after passing through the diluent orifice is lower than the pressure before the diluent orifice therefore the diaphragm will always be persuaded against the rotor to form a seal and thus prevent diluent passing through the pump to the source reservoir.

In some example arrangements, the dilution mechanism may comprise a concentrate disperser means for dispersing the concentrate liquid and increasing the surface area of the concentrate liquid for promoting mixing with the diluent liquid. In some examples, the concentrate disperser means may be configured and arranged for dispersing the concentrate liquid as a film for promoting mixing with the diluent liquid; for example, the disperser means may comprise a flexible member, shaped as an annular or circular disc (such as a washer), configured and arranged for dispersing the concentrate liquid (in diluted, undiluted or partially diluted form) radially outward, by deflecting the flow of the liquid such that the radial flow of the dispersed liquid may be substantially uniform azimuthally around the central axis. In some examples, the concentrate disperser means may comprise an atomiser means forming the concentrate liquid into a plurality of droplets.

In some example arrangements, the dilution mechanism (or more specifically, the concentrate disperser means) may comprise a labyrinthine passage configured for conveying the concentrate liquid over an extended flow path operable to promote mixing with the diluent liquid. In other words, the dilution mechanism may comprise a convoluted or reticulated passage arrangement through which the concentrate liquid and diluent liquid can flow to extend the path and time over which the concentrate and diluent liquids can mix.

Preferably, the diluted or undiluted concentrate liquid can combine with the additive fluid within the additive chamber. The diluted or undiluted concentrate liquid can at least partially combine within a receptacle into which the liquid is to be dispensed. Suitably, in all aspects of the present invention, at least some of the diluted or undiluted concentrate liquid and the additive liquid may be allowed to flow into the additive mechanism simultaneously to combine at least partly in the additive mechanism; and/or at least partly sequentially to combine partly in the additive mechanism and partly in a receptacle, or to combine only in a receptacle.

In some example arrangements, the additive inlet may be configured to be substantially free of nucleation sites for the formation of gas bubbles within additive fluid when the additive fluid is an effervescible liquid. For example, the additive duct may be substantially free of abrupt changes in direction or in cross-sectional area, and/or free of corners or surface asperities.

In some example arrangements, the additive chamber may comprise bubble nucleation means and/or be configured to include nucleation sites for promoting the formation of gas bubbles. For example, the additive chamber may contain a gauze or open mesh or textured surface to promote abrupt changes in direction and/or cross-sectional area. Such arrangements may be suitable for use where the additive fluid is nitrogenated liquid, in which some nitrogen gas has not been absorbed (in other words, dissolved) in water or other carrier liquid and remains present in the form of micro-bubbles (that is, bubbles having a relatively small mean size). Unlike carbonated water in which carbon dioxide is present in water, it may be relatively more difficult to break the bubbles out of solution, and if it is desirable for form a head of foam on the dispensed liquid, then a surface configured for promoting the nucleation of bubbles may be required, since agitation of the beverage in the beverage receptacle may be insufficient to achieve a desired amount of foam.

In some example arrangements, the additive mechanism may comprise an additive disperser means for dispersing the additive fluid within the additive chamber; and may be configured such that the additive fluid will be dispersed before being combined with the diluted (or undiluted) concentrate liquid.

A beverage dispenser according to the present invention may further comprise a regulation system comprising a diluent flow rate regulator means for regulating the flow rate of the diluent liquid into the dilution mechanism; and/or the regulation system may comprise an additive flow rate regulator means for regulating the flow rate of the additive fluid into the additive mechanism. The flow rate regulator means for the diluent liquid and/or the additive fluid may comprise a pressure-responsive flow control means operable to oppose a change in the flow rate of the diluent liquid in response to a change in the pressure of the diluent liquid/additive fluid received from the diluent source/additive source, respectively (fluid flow rate may be regulated in terms of flow velocity, or flux, being the mass of the fluid passing through a unit area per unit time). An example additive flow rate regulator means may be configured such that the flow rate of the additive fluid when its pressure is 1 000 kPa is no more than 110% of the flow rate of the additive fluid when its pressure in the additive source is 600 kPa. In another example additive flow rate regulator means may be configured such that the flow rate of the additive fluid when its pressure is 600 kPa is no more than 110% of the flow rate of the additive fluid when its pressure in the additive source is 100 kPa.

Example flow rate regulator means may comprise a flexible member having a central orifice connecting opposite ends, in which the flowing fluid will flow through the orifice; configured such that the orifice will respond to an increase in fluid pressure by reducing in cross-section area, and to a decrease in fluid pressure by increasing in cross-section area.

In some example arrangements, the regulation system may comprise a processor means configured for receiving input data indicative of the quantity of liquid product to be dispensed and for issuing control signals operable to control at least one respective operating parameter of each of the diluent quantity regulator and the additive quantity regulator, to dispense the quantity of the liquid product. The processor means may be an electronic computer processor, or microprocessor. The processor means may comprise a data receiver means for receiving data in the form of electromagnetic, electronic or optical signals.

In some example arrangements, the diluent quantity regulator means may comprise a diluent flow control means capable of being put into an open state and a closed state in response to the control signal received from the processor means, configured and arranged such that the diluent liquid can enter the dilution mechanism when the diluent flow control means is in the open state and the diluent liquid cannot enter the dilution mechanism when the diluent flow control means is in the closed state.

In addition or alternatively, the additive quantity regulator means may comprise an additive flow control means capable of being put into an open state and a closed state in response to the control signal received from the processor means, configured and arranged such that the additive fluid can enter the additive mechanism when the additive flow control means is in the open state and the additive fluid cannot enter the additive mechanism when the additive flow control means is in the closed state.

In some example arrangements, the processor means may be configured operable to receive data that is indicative of a mean diluent liquid flow rate into the dilution mechanism when the diluent flow control means is in the open state, and/or a quantity of the diluent liquid to be mixed with the concentrate liquid, and/or a pumping rate at which the concentrate is being or can be pumped. The processor means may be configured for putting the diluent flow control means in the open state for a sufficient period to allow the quantity of diluent liquid to enter the dilution chamber, and then put the diluent flow control means into the closed state.

In some example arrangements, the processor means may be configured operable to receive data that is indicative of a mean additive fluid flow rate into the additive mechanism when the additive flow control means is in the open state, and/or a quantity of the additive fluid to be combined with the concentrate liquid, and/or a pumping rate at which the concentrate is pumped. The processor means may be configured for putting the additive flow control means in the open state for a sufficient period to allow the quantity of additive fluid to enter the additive chamber, and then put the additive flow control means into the closed state.

In some examples, the processor means may be configured operable to receive sugar content data that is indicative of a quantity of sugar contained within the concentrate liquid; determine a quantity of diluent liquid to be mixed with the concentrate liquid, the determination being based on the sugar content data; put the diluent flow control mechanism in the open state for a sufficient period to allow the determined quantity of diluent liquid to enter the dilution chamber, and then put the diluent flow control mechanism into the closed state. The sugar content data may be expressed in terms of a Brix value, such as degrees Brix.

In an embodiment, the dispenser head of the present invention may comprise a plurality of elements that can be functionally coupled to each other, a first element comprising the dilution mechanism, and a second element comprising the additive mechanism. For example, the dispenser head may comprise a coupling mechanism for reversibly connecting the additive mechanism to the dilution mechanism such that when the additive mechanism is connected to the dilution mechanism by the coupling mechanism, diluted concentrate liquid can flow from the dilution mechanism into the additive mechanism.

In some example arrangements of an in-line dispenser assembly, a supplemental fluid supply system may be configurable for supplying at least one of the diluent liquid and the additive fluid at a temperature in the range of 1° C. to 10° C. The supplemental fluid supply system may be configurable for supplying effervescible additive liquid at a pressure of 600 to 1 000 kPa. The supplemental fluid supply system may be capable of supplying carbonated or nitrogenated aqueous additive liquid. It may also be desirable to maintain the temperature of the concentrate liquid in the range from 2° C. to 10° C., partly to preserve the usable life of the concentrate liquid and partly to control the temperature of the mixed liquid (for example, a beverage) dispensed into a receptacle. For example, the concentrate may be maintained at about 6° C. If the temperature of the concentrate liquid is too low, then its viscosity may become too high to flow and if the temperature of the concentrate is too high its shelf life may be reduced.

Some example methods of dispensing liquid product may include connecting the dilution mechanism to a diluent source of diluent liquid; putting the diluent source into fluid communication with the dilution mechanism to allow a quantity of the diluent liquid to flow into the dilution mechanism and mix with the concentrate liquid to provide a quantity of diluted concentrate liquid, and then blocking fluid communication between the diluent source and the dilution mechanism to prevent additional diluent liquid from flowing into the dilution mechanism; and dispensing the quantity of liquid product comprising the quantity of diluted concentrate and the quantity of additive liquid.

In another example embodiment, the method may include activating the pump and putting the diluent source into fluid communication with the dilution mechanism to allow a quantity of the diluent liquid to flow into the dilution mechanism and mix with the concentrate liquid to provide diluted concentrate liquid; dispensing at least a portion of the quantity of the diluted concentrate into a receptacle via the additive mechanism while the additive source is not in fluid communication with the additive mechanism; and after a period putting the additive source into fluid communication with the additive mechanism and dispensing the quantity of the additive liquid into the receptacle, such that at least a portion of the quantity of the additive liquid and at least the portion of the diluted concentrate combine in the receptacle.

An example method of cleaning the dispenser head may include a sequence of deactivating the pump after a period of use, then after a further period shutting off the flow of diluent liquid, and then after a further period shutting off the flow of additive fluid. This may have the effect of cleaning the dilution and additive chambers to remove traces of concentrate deposited from the concentrate liquid, which may have a relatively high sugar content (a high Brix value); and/or the concentrate liquid may comprise or consist of a dairy product that may result in fatty deposits if the dilution and/or additive chambers, or other parts of the dispenser head are not cleaned.

The dispenser head should be configured such that the diluted or undiluted concentrate liquid cannot enter the additive duct and the additive fluid cannot enter the source of the concentrate liquid.

The dispenser head may be disposable, and/or comprise recyclable material. The dispenser head may be reusable. For example, the dispenser head may comprise a quick release connector, to facilitate use with multiple concentrate vessels.

Whilst the dispenser head of the present invention may be used for dispensing a variety of liquid products, including foamed and non-foamed products, such as carbonated or nitrogenated beverages, carbonated or nitrogenated foodstuffs, for example cream or milk products, or foamed soaps, for simplicity the dispenser head of the present invention will be described in more detail in relation to carbonated or nitrogenated beverages. The detailed disclosure relating to carbonated or nitrogenated beverages apply equally to all carbonated or nitrogenated liquids.

Example embodiments of the present invention will be described with reference to the accompanying drawings, of which FIG. 1 shows a schematic side view of an example in-line beverage dispenser system;

As used herein, an effervescible liquid is a liquid that is capable of effervescing; for example, in response to a decrease in the pressure applied to the carrier liquid or an increase in its temperature. Effervescible liquid may comprise dissolved molecular species within a carrier liquid, in which the molecular species can come out of solution in the gaseous state in the form of gas bubbles. For example, effervescible water (or other liquid, such as dairy liquid) may consist of or comprise carbon dioxide or nitrogen or nitrous oxide dissolved and/or suspended within water (or other liquid).

Carbonated beverages comprise carbon dioxide dissolved in the beverage, in which carbon dioxide gas bubbles will evolve from the solution during effervescence. Nitrogenated beverages may comprise nitrogen suspended in the beverage, in which nitrogen gas bubbles will evolve during effervescence. While nitrogen is substantially less soluble in water than carbon dioxide, relatively very small nitrogen gas bubbles may be held in suspension in water. The nitrogenated liquid may comprise nitrous oxide, nitrogen or air bubbles suspended in liquid. For example, nitrogen may be introduced into beer or coffee, and nitrogenated beer may be stored in kegs. Unless otherwise stated herein, the term 'carbonated' includes 'carbonated' or 'nitrogenated'; that is a carbonated liquid may contain dissolved carbon dioxide or dissolved and/or suspended nitrogen. Carbonated liquid may be capable effervescing, the effervescence involving the evolution of carbon dioxide or nitrogen gas bubbles.

The additive fluid may comprise or consist essentially of carbonated liquid, suitably carbonated water, nitrogenated liquid, suitably nitrogenated water or dairy liquid or other aqueous liquid, containing as much dissolved or suspended carbon dioxide or nitrogen as possible. The saturation level of carbon dioxide or nitrogen generally increases with increasing pressure and decreasing temperature, for example, the highest concentration in water being achievable by chilling water to just above freezing. When the temperature is raised or the pressure is reduced, bubbles of gas tend to form in the water or other liquid, which is known as effervescence. The rate of dissolution of gaseous carbon dioxide or nitrogen from the liquid depends on the number and size distribution of the gas bubbles introduced into the liquid, the pressure applied to the liquid, and the time allowed to reach the saturation level.

Figure 1:
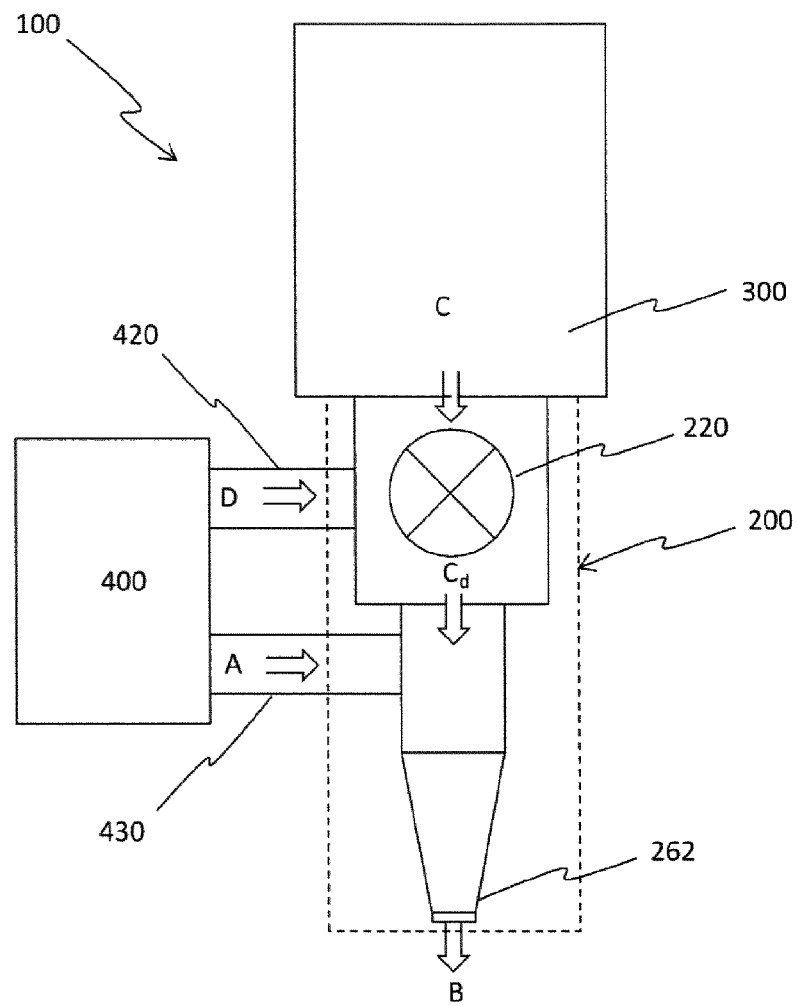

With reference to FIG. 1, an example in-line beverage dispenser assembly 100 for dispensing a beverage B may comprise an example dispenser head 200 and an example supplemental fluid system 400. The dispenser head 200 may comprise a pump 220, an inlet of which is connected to an outlet of a vessel 300 containing concentrate liquid C for the beverage B, such that the pump 220 can pump the concentrate liquid C from the vessel 300. The supplemental fluid system 400 can supply a diluent liquid D for diluting the concentrate liquid C via a diluent channel 420, and an additive fluid A via an additive channel 430. In some examples, the supplemental fluid system 400 may be capable of supplying effervescible additive liquid A via the additive channel 430. The pump 220 can pump concentrate liquid C from the vessel 300 as a series of quanta into a dilution chamber (not shown in FIG. 1); and a diluent duct (not shown in FIG. 1) can convey diluent liquid D from the diluent channel 420 into the dilution chamber, in which the concentrate liquid C can mix with the diluent liquid D to dilute the concentrate liquid C and thus reduce its viscosity. The diluted concentrate Cd can flow from the dilution chamber into an additive chamber (not shown in FIG. 1). If the viscosity or dilution ratio of the concentrate liquid C is sufficiently low, it may not be necessary to dilute it with diluent liquid D, and in such examples, the pumped concentrate liquid C may pass through the dilution mechanism that includes the dilution chamber, into the additive chamber comprised in an additive mechanism without being mixed with diluent. Whether or not the concentrate liquid C has been diluted with diluent liquid D, the liquid passing from the dilution mechanism to the additive mechanism will be referred to herein as the diluted concentrate Cd, unless otherwise stated. The additive mechanism may be configured for receiving the additive fluid A and combining it with the diluted concentrate Cd to provide the beverage B dispensed via outlet nozzle 262 into a receptacle (not shown).

The beverage B may generally comprise predetermined or calculable quantities of the concentrate liquid C, the diluent liquid D and the additive fluid A. The dispenser assembly illustrated in FIG. 1 comprises a regulation system (not shown) operable to regulate at least one operating parameter of the pump (for example, whether the pump is activated or deactivated), the quantity of diluent liquid D that flows into the dilution mechanism and the quantity of additive fluid that flows into the additive mechanism. For example, the regulation system may comprise a diluent valve mechanism (not shown) for regulating whether or not diluent liquid D can flow from the diluent channel 420 into the dilution mechanism, and an additive valve mechanism (not shown) for regulating whether or not additive fluid A can flow from the additive channel 430 into the additive mechanism.

The regulation system may comprise an electronic processor device such as a computer microprocessor (not shown) configured to control the operation of the diluent and additive valve mechanisms on the basis of input data received and processed by the electronic processor. For example, the supplemental fluid system 400 may comprise a radio-frequency identification (RFID) device capable of indicating the respective flow rates of each of the diluent liquid D and the additive fluid A. The regulation system may comprise a device capable of receiving data transmitted by the RFID device and converting the data into electronic form for processing by the electronic processor. In some examples, the electronic processor may be configured to determine the respective periods of time for which the diluent valve mechanism and the additive valve mechanism should be put in an open state to allow the diluent liquid D and the additive fluid A, respectively, to flow into the dilution mechanism and the additive mechanism, respectively, based on their respective flow rates. The electronic processor device may put each of the diluent valve device and the additive valve device into a closed state after the respective periods of time, by issuing respective electronic control signals. The quantities of the diluent liquid D and the additive liquid A to be combined with the concentrate liquid C may thus be determined and regulated. Means other than RFID devices, for example QR code or bar code readers, are also envisaged by this disclosure for inputting data into the regulation system.

An effervescible additive liquid may be saturated with carbon dioxide or nitrogen to a known value, thus enabling calculation of the quantity of additive fluid to introduce. For example, effervescible additive liquid may be preferably provided at about 2° C., at which the saturation level may be known.

In examples where the additive fluid A is an effervescible liquid such as carbonated or nitrogenated water or other aqueous liquid, it may be desirable for the beverage to exhibit a degree of effervescence. The degree of effervescence may be characterizable in terms of a quantity of gas bubble formation, potentially expressed in terms of a quantity of gas that evolves from the beverage B as the dissolved carbon dioxide or nitrogen comes out of solution in the form of gas bubbles. The effervesce may be characterizable in terms of a number and size distribution of evolved gas bubbles, and/or a rate of gas bubble formation, for example. It may be desirable for the effervescence to be within a certain range: too much effervescence may result in excess foam on the beverage B, and too little effervescence may result in the beverage B being too flat (that is, the quantity of gas that evolves within the beverage is too little). In some examples, the dispenser head may have the aspect of achieving a desired quantity of effervescence in beverage B.

With reference to FIGS. 2A to 2E, an example dispenser head 200 may comprise an attachment mechanism 210 for attaching the dispenser head 200 to the vessel 300 containing the concentrate liquid C. The example attachment mechanism 210 includes a duct 211 for conveying the concentrate liquid C from the vessel 300 to an inlet 221A of the pump 220. The vessel 300 may be provided as part of the dispenser head 200, either detachably or as an integrated unit, or it may be provided separately from the dispenser head 200. The attachment mechanism 210 may be cooperatively configured with a counterpart mechanism comprised in the vessel 300.

Figure 2A:
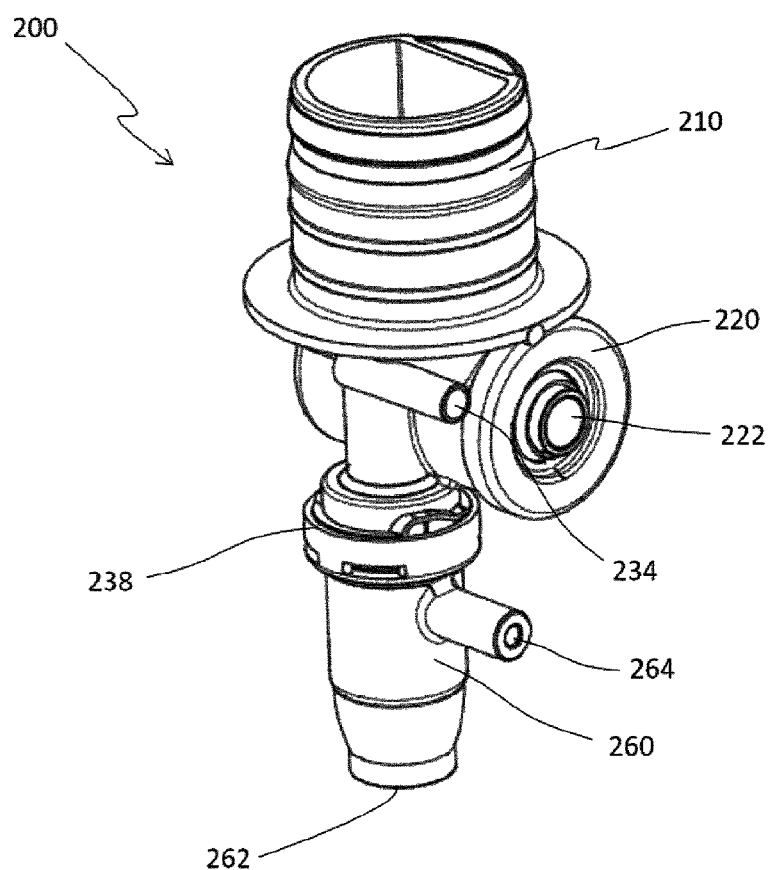
FIG. 2A shows a schematic perspective view of an example dispenser head.
Figure 2B:
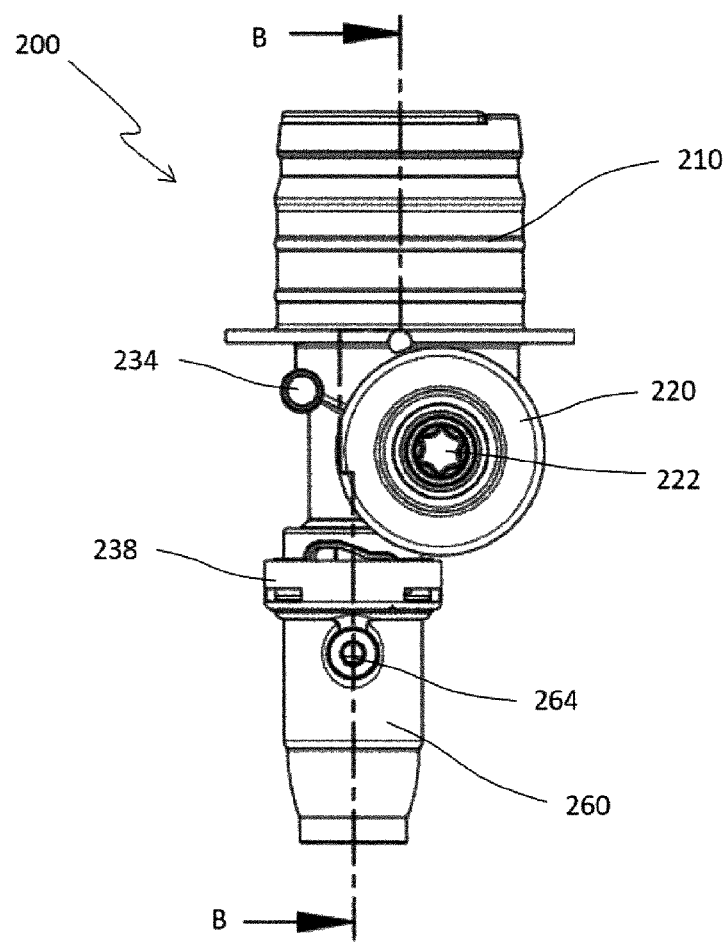
FIG. 2B shows a schematic side view of the example dispenser head shown in FIG. 2A.
Figure 2C:
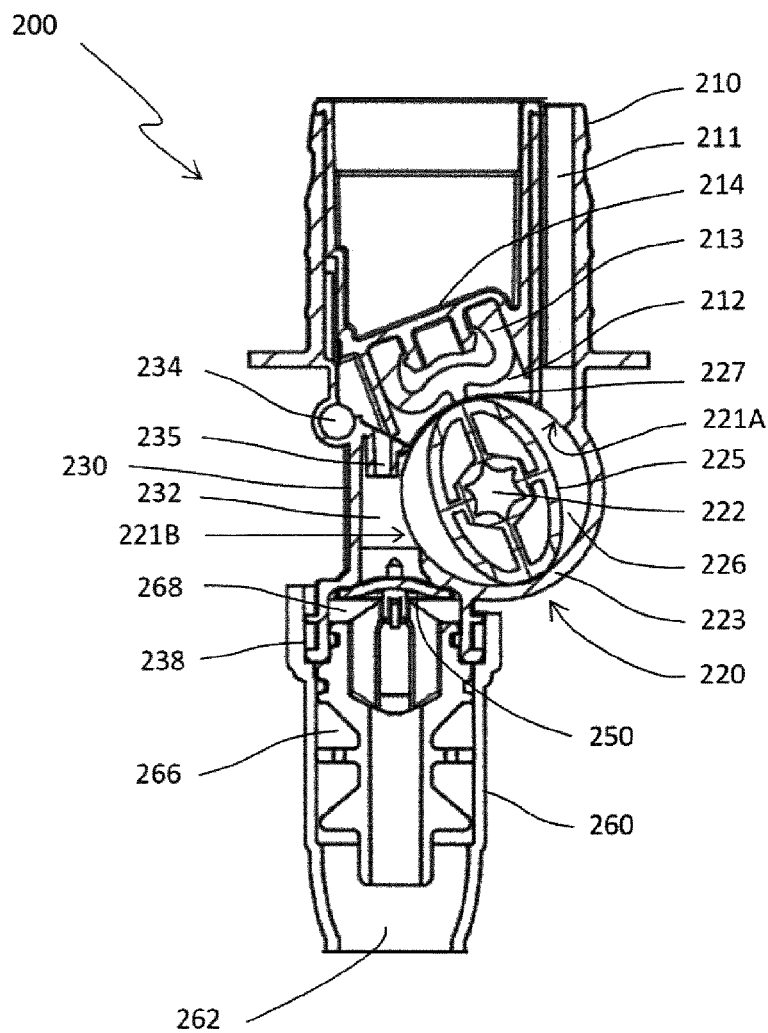
FIG. 2C shows a schematic longitudinal cross-section view the example dispenser head shown in FIG. 2A.

With particular reference to FIG. 2C, an example pump 220 may comprise a rotor 225 within a pump housing 223, in which the rotor 225 can be driven by a motor (not shown) coupled to a rotor transmission mechanism 222 (in FIG. 2C, the axis of rotation of the rotor 225 is perpendicular to the page). The pump housing 223 may have a cylindrical inner surface within which the rotor 225 can fit and rotate such that a surface area of the rotor 225 contacts the inner surface of the pump housing 223. The pump housing 223 may comprise resilient material and the rotor 225 may slightly depress the inner surface of the pump housing 223 to ensure a sufficiently good seal between the rotor 225 and the pump housing 223 to prevent pumped concentrate liquid C from passing between the rotor surface area and the inner surface of the pump housing 223 where these abut each other. In the particular example illustrated, the surface of the rotor 225 includes two opposite surface areas that are spaced radially inward to form respective pump chambers 226 on diametrically opposite sides of the rotor 225 (only one of the pump chambers is indicated by 226 in FIG. 2C). The volume of each pump chamber 226 will define the volume of each quantum of concentrate liquid C pumped into the dilution chamber 232 via the pump outlet 221B. Each of the pump chambers 226 can receive concentrate liquid C when the respective pump chamber 226 is in fluid communication with the pump inlet 221A. As the rotor 225 is driven to rotate in use (in a clockwise direction as illustrated in FIG. 2C), concentrate liquid C within the pump chamber 226 will be conveyed around the pump housing 223 until the pump chamber 226 becomes in fluid communication with the pump outlet 221B and the concentrate liquid C is expelled from the pump chamber 226 into the pump outlet 221B.

In the particular example illustrated in FIG. 2C, the pump 220 comprises a seal membrane 227, which may be formed as a unitary part of the pump housing 223 or joined to the rotor housing 223 by welding, adhesive or other means. The seal membrane 227 is sufficiently flexible and resilient that it can remain in contact with a relatively complex shaped rotor surface including the radially depressed area forming the pump chamber 226. A resilient compression member 213 may be located within a rear chamber 212 behind the seal membrane 227; that is, the compression member 213 may arranged on the side of the seal membrane 227 opposite the side that contacts the rotor 225. In this example, the resilient compression member 213 is elongate and has a generally "U"-like shape when viewed in transverse cross-section, as shown in FIG. 2C, having a pair of elongate leg members seated against a fixed backing wall 214 of the rear chamber 212. A rib projecting from the opposite side of the resilient compression member 213 may abut the rear side of the seal membrane 227; that is, the side of the seal membrane 227 facing the rear chamber 212. The rear chamber 212 and the resilient compression member 213 are configured such that the resilient compression member 213 will be in compression between the backing wall 214 and the seal membrane 227, so that the rib of the resilient member 213 can urge the seal membrane 227 against the surface of the rotor 225 as the rotor 225 is driven to rotate within the rotor housing 223. The seal membrane 227 will thus be urged against the surface of the rotor 225 with sufficient force to prevent concentrate liquid C from passing between the seal membrane 227 and the rotor 225 and, consequently from passing from the pump outlet 221B to the pump inlet 221A, and to expel concentrate C from a pump chamber 226 into the pump outlet 221B.

The example pump 220 described with reference to FIG. 2C can pump the concentrate liquid C from the vessel 300 as a series of quanta, each having a known volume and delivered to the dilution mechanism at a known rate, determined by the angular velocity of the rotor 225 and the total degrees of rotation. The volume of each quantum of concentrate liquid C will be defined by the volume of each pump chamber 226. The quantity of concentrate liquid C delivered for producing a quantity of beverage B can be determined as a number of quanta. In other example dispenser heads, different kinds of pumps may be used, which may pump the concentrate liquid C as a continuous stream at a known or selectable flow rate.

In various example arrangements, the pump 220 may be substantially as disclosed in any of international patent application publication numbers WO2006/027548, WO2010/122299, WO2013/050491, WO2014060418, WO2013/050488, WO2013/117486, or WO2014/135563; or in UK patent application publications number GB 2 551 663 or GB 2 507 029 (although example pump mechanisms are in no way limited to those disclosed in these publications).

In certain examples, it may be desirable to reduce the viscosity of the concentrate liquid C before it is combined with the additive fluid A, by diluting the concentrate liquid C with a suitable diluent liquid D, particularly when the additive fluid A is an effervescible liquid. This may allow effervescible additive liquid A to be combined with the diluted concentrate Cd sufficiently gently to reduce, minimise or prevent premature or excessive effervescence of the additive liquid A or the dispensed beverage B.

The illustrated example dilution mechanism comprises a dilution housing 230 that includes a dilution chamber 232, and a diluent duct for conveying diluent liquid D from the diluent channel 420 of the supplemental fluid system 400 into the dilution chamber 232. The dilution chamber 232 is in fluid communication with the pump outlet and can receive and mix together pumped concentrate liquid C as well as diluent liquid D. The diluent duct may comprise a number of chambers, orifices and passages that are in fluid communication with each other operable to convey the diluent liquid D from the diluent channel to the dilution chamber 232; for example, the diluent duct may be formed of a diluent inlet 234 and an orifice 235 into the dilution chamber 232.

Figure 2D:
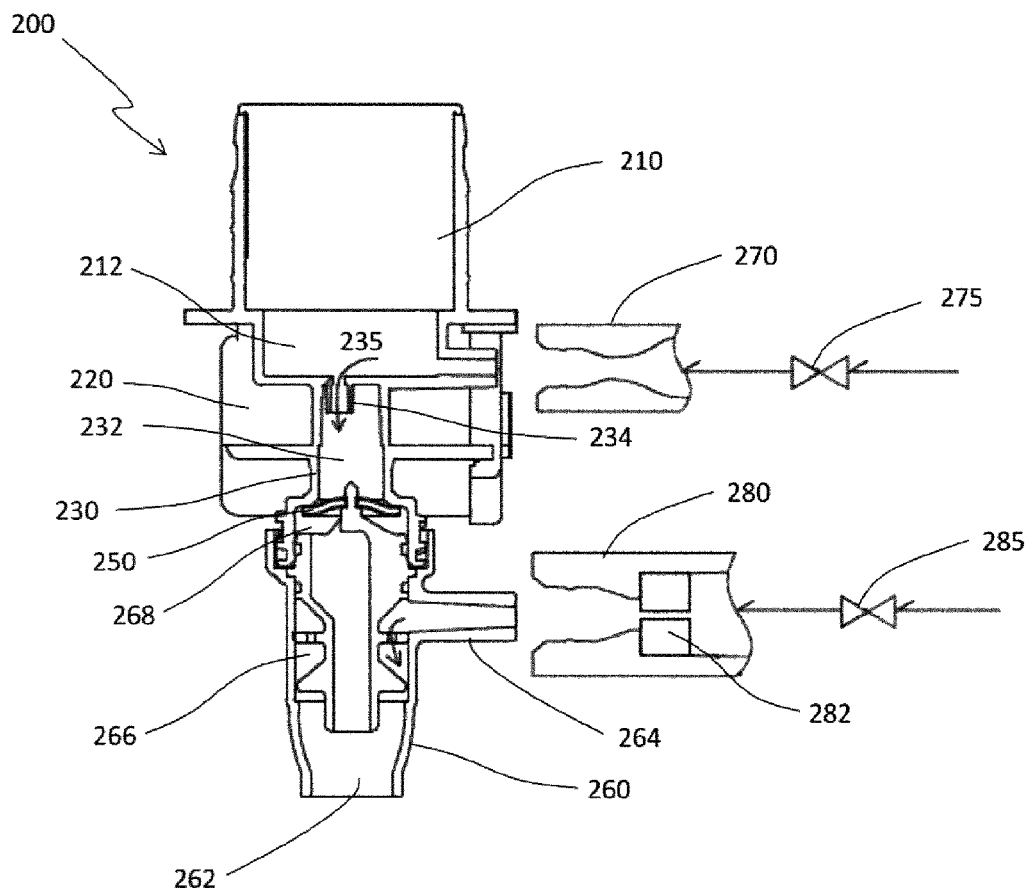
FIG. 2D shows a schematic longitudinal cross-section view of a partly assembled dispenser head in the plane B-B shown in FIG. 2B (in a plane perpendicular to that shown in FIG. 2C)

In the particular example illustrated in FIGS. 2C and 2D, the diluent duct may include the rear chamber 212 and is thus in fluid communication with the rear side of the seal membrane 227. The pressure of the diluent liquid D may thus be transmitted onto the rear side of the seal membrane 227, supplementing or replacing the force applied to the seal membrane 227 by the resilient compression member 213 for urging the seal membrane 227 against the surface areas of the rotor 225. In some other examples, the diluent duct may be segregated from the rear chamber 212 and seal membrane 227 by a barrier means. Thus, the force applied onto the seal membrane 227 may be a combination of the force applied by the compression member 213 and the pressure differential across the restricted orifice 235 (which may be referred to as a 'jet orifice', particularly if its area is sufficiently small that liquid passing through it will emerge as a jet of liquid).

With particular reference to FIGS. 2C and 2D, the diluent duct may include a jet orifice 235, having a sufficiently small area that the diluent liquid D passing through it will spray into the dilution chamber 232 as a jet of diluent liquid D. This may have the aspect of promoting turbulence and rapid mixing of the pumped concentrate C with the jet of diluent liquid D. The area of the jet orifice 235 may be substantially smaller than the mean cross-section area of the rest of the diluent duct, resulting in a substantial increase in the velocity and a drop in pressure at which the diluent liquid D passes from the jet orifice 235 into the dilution chamber 232.

With further reference to FIGS. 2C and 2D, the example dispenser system may comprise a one-way valve 250 through which the diluted concentrate Cd will pass, configured and arranged for promoting turbulence of the diluted concentrate Cd and consequently promoting the rapid and thorough mixing of the diluent liquid D and the concentrate liquid C. The one-way valve 250 is preferably located on the path of the diluted concentrate Cd as it passes from the dilution chamber 232 to the additive mechanism and suitably substantially prevents additive liquid A from flowing upstream into the dilution chamber 232. The dilution mechanism or the additive mechanism may comprise the one-way valve 250, or the one-way valve may be located between the dilution and additive mechanisms.

Figure 2E:
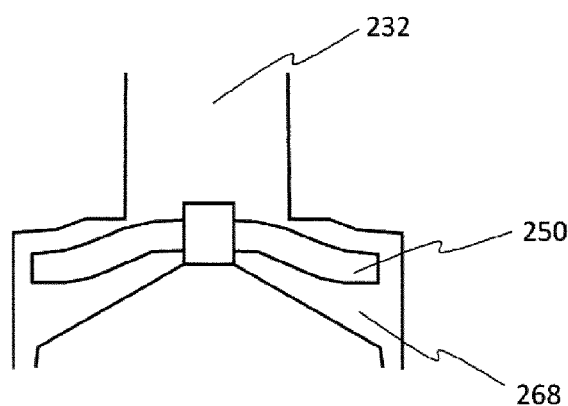
FIG. 2E shows a schematic longitudinal cross-section of a part of the example dispenser head shown in FIG. 2D.

With reference to FIG. 2E, an example one-way valve comprises a flexible member 250 in the form of an annular disc or ring, such as a polymer washer, for example. The flexible member 250 may extend generally radially from a central axis, a peripheral area of the flexible member 250 abutting a seat area of the housing of the dilution mechanism when no fluid is passing from the dilution mechanism to the additive mechanism. When at least partially diluted concentrate Cd is contained within the dilution chamber 232 and in contact with a side of the flexible member 250, and the pressure of the diluted concentrate Cd is sufficiently great, the peripheral area of the flexible member 250 may be deflected away from the seat and thus permit the diluted concentrate Cd to pass between the peripheral area and the seat, into a chamber 268 included in the additive mechanism. A radially outward component may thus be imparted to the velocity of the diluted concentrate Cd; the resulting increased turbulence within the at least partially diluted concentrate Cd may have the effect of rapidly improving the homogeneity of the mixture of the diluent and concentrate liquids D, C before the diluted concentrate Cd is combined with the additive liquid A. In addition, the radially outwardly moving flow of diluted or undiluted concentrate Cd may hit a radial wall of the additive chamber, causing turbulent flow of the diluted or undiluted concentrate Cd and thereby further promoting mixing.

In some examples, diluent liquid may be introduced into the dilution chamber 232 at a pressure of about 150 kPa through the diluent orifice 235. While this is likely to cause some mixing of the diluent liquid D with the concentrate liquid D, the diluted concentrate mixture may not be homogeneous. The relatively pressurised diluted concentrate is then forced past the flexible member 250, which may comprise an elastomeric washer valve in some examples, which can flex to allow the diluted concentrate Cd to pass from the dilution chamber 232. The extent to which the flexible washer 250 flexes will generally depend on the viscosity and pressure of the diluted concentrate Cd, and the flexibility of the washer 250. In certain preferred example arrangements, the diluted concentrate Cd may be forced into a relatively thin film. To allow a sufficient quantity of the diluted concentrate Cd to pass, the length of the thin film needs to sufficiently great relative to the thickness of the film, which may be achieves if the flexible washer valve 150 is circular and has a sufficiently long circumference. The diluted concentrate Cd in the film may travel at high velocity and consequently relatively low pressure. The film exits into a first volume 268 of an additive chamber, the first volume configured to direct the film of diluted concentrate Cd into a centre region of the first volume 268. The high velocity of the diluted concentrate Cd and the abrupt change of its direction of travel will likely cause further mixing and homogenisation, and upon exiting the first volume 268 of the additive chamber, the diluted concentrate may be a substantially homogeneous diluted mixture.

With particular reference to FIG. 2D, the regulation system of the dispenser system 200 may comprise a diluent flow control mechanism 275 for regulating the flow of the diluent liquid D through the diluent inlet passage 234. For example, the diluent flow control mechanism 275 may comprise a shut-off valve that can be put into an open state, in which diluent liquid D can pass through it, or into a closed state, in which the diluent shut-off valve 275 will prevent the diluent liquid D from flowing into the dilution duct. The diluent shut-off valve 275 may be seated within a valve housing 270, which may be attachable to the diluent inlet 234. The diluent shut-off valve 275 may be electrically actuatable by means of a solenoid device (not shown), which may be controlled by an electronic processor device (not shown). When the dispenser head 200 is used and the concentrate C is pumped into the dilution chamber 232, the diluent shut-off valve 275 may be put in the open state so that diluent liquid D can flow into the dilution chamber 232 and mix with the concentrate C. When the required quantity of the dilution liquid D has flowed into the dilution chamber 232, the diluent shut-off valve 275 may be automatically closed. The required quantity of diluent liquid D may be determined as being proportional to the diluent flow rate (in terms of the mass of diluent liquid D flowing through a unit area per unit time, for example) multiplied by the time period for which the diluent shut-off valve 275 has been open.

The additive mechanism may comprise an additive housing 260 including first and second volumes 268, 266 of an additive chamber and an additive inlet 264, which may be substantially free of corners or abrupt changes in direction in order to reduce or substantially prevent premature or excessive effervescence of effervescible additive liquid A such as carbonated water. Diluted concentrate liquid Cd (or undiluted concentrate, in some examples) can flow from the dilution chamber 232 into an uppermost volume 268 of the additive chamber via the one-way valve 250, in some example arrangements. In addition, additive fluid A can flow from the additive channel 430 of the supplemental fluid system 400, via the additive inlet 264 into a volume 266 of the additive chamber, where it may at least partly combine with the diluted concentrate Cd and pass through an outlet nozzle 262 into a cup or other receptacle (not shown). The additive liquid A and the diluted or undiluted concentrate Cd may mix partly or substantially entirely in the additive chamber and/or in the receptacle. The additive mechanism may include a sieve (not shown) or other suitable agitation means for promoting the nucleation of gas and consequently the effervesce of the additive liquid A or the beverage B, particularly for use with certain liquids that need to be agitated in order to effervesce (that is, for gas bubbles to nucleate), such as nitrogenated liquid. For example, an agitation sieve may be located at or near the outlet nozzle 262 and may comprise sieve holes of about 750 microns in diameter or facetted hole of similar cross-sectional area.

With particular reference to FIG. 2D, the regulation mechanism may comprise an additive flow control mechanism 285 for regulating the flow of the additive fluid A through the additive inlet 264. For example, the additive flow control mechanism 285 may comprise an additive shut-off valve that can be put into an open state, in which additive fluid A can pass through it, or a closed state, in which the additive shut-off valve 285 will prevent the additive fluid A from flowing into the volume 266 of the additive chamber. The additive shut-off valve 285 may be seated within close proximity to a valve housing 280, which may be attachable in close proximity to the additive inlet 264. The additive shut-off valve 285 may be electrically actuatable by means of a solenoid device (not shown), which may be controlled by an electronic processor device (not shown). When the dispenser head 200 is in use, the additive shut-off valve 285 may be put in the open state so that additive liquid A can flow into the volume 266 of the additive chamber. After the required quantity of additive fluid A has flowed into the additive chamber 266, the additive shut-off valve 285 may be automatically closed. The required quantity of additive fluid A may be determined as being proportional to the additive liquid flow rate (in terms of the mass of additive liquid D flowing through a unit area per unit time, for example) multiplied by the time period for which the additive shut-off valve 285 has been open.

The regulation system may comprise a pressure-responsive valve 282 located within a valve housing 280. For example, the pressure-responsive valve 282 may comprise a passage through which carbonated water A can flow and be configured such that the rate at which the carbonated water at a temperature of about 1° C. to about 10° C. passes through passage will be substantially constant (for example, about 16 ml/s to about 24 ml/s, or about 20 ml/s) over a pressure range of about 140 kPa to about 1000 kPa (higher saturation may be achieved by using higher pressures of up to about 1000 kPa in some arrangements). In general, the pressure-responsive valve 282 may limit the variation of the flow speed of a chilled effervescible additive liquid A to no more than plus or minus about 10%, or plus or minus about 5%, as a function of the pressure of the additive liquid A in the range of about 100 kPa to about 1000 kPa. The effervescible additive liquid A may contain dissolved carbon dioxide or suspended nitrogen at, or slightly less than, the saturation solubility under prevailing conditions. The quantity of additive liquid A may be thus controlled by the timing of operation of the shut off valve.

In examples where the additive fluid A is an effervescible liquid, it may be desirable for the content of dissolved carbon dioxide or suspended nitrogen to be at or close to the saturation solubility level, and for the saturation solubility level to be as high as practically possible. This may be achieved by providing the effervescible additive liquid A at a low temperature (for example, only slightly above the freezing point of the liquid) and at a relatively high pressure. The mean diameter (or, more generally, transverse cross-section area) of a supply tube (not shown) conveying the additive liquid A to the pressure response valve 282 may be substantially greater than the mean diameter (or transverse cross-section area) of the passage through the pressure-response valve 282, for the pressure of the additive fluid A upstream of the pressure-response valve 282 to be sufficiently high to keep the liquid saturated with effervescible gas whilst reducing or substantially preventing effervescence at this stage. The additive inlet 264 may have a smaller diameter to reduce the magnitude of the pressure drop across the pressure-responsive valve 282, which would create excessive breakout of gas. In some example arrangements, the flow rate and quantity of diluent liquid D may be controlled by similar mechanisms as disclosed for the additive fluid A.

Figure 3A:
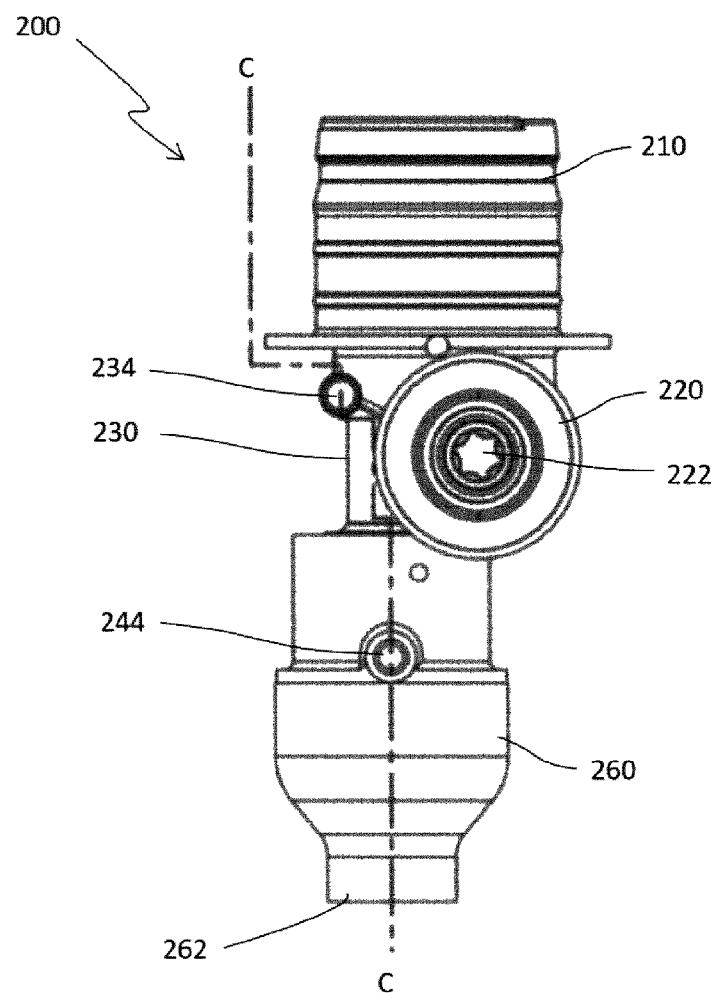
FIG. 3A shows a schematic side view of an example dispenser head.
Figure 3B:
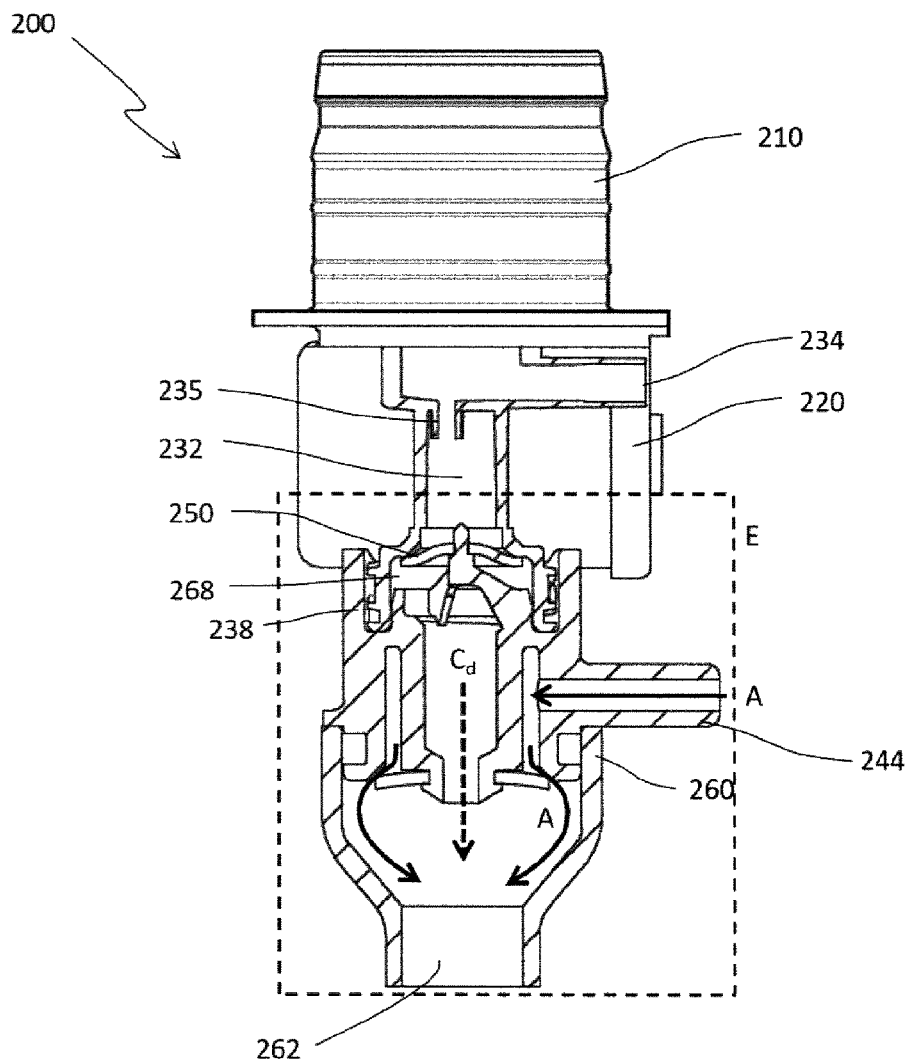
FIG. 3B shows a schematic partial cross-section view on the plane C-C indicated in FIG. 3A.
Figure 3C:
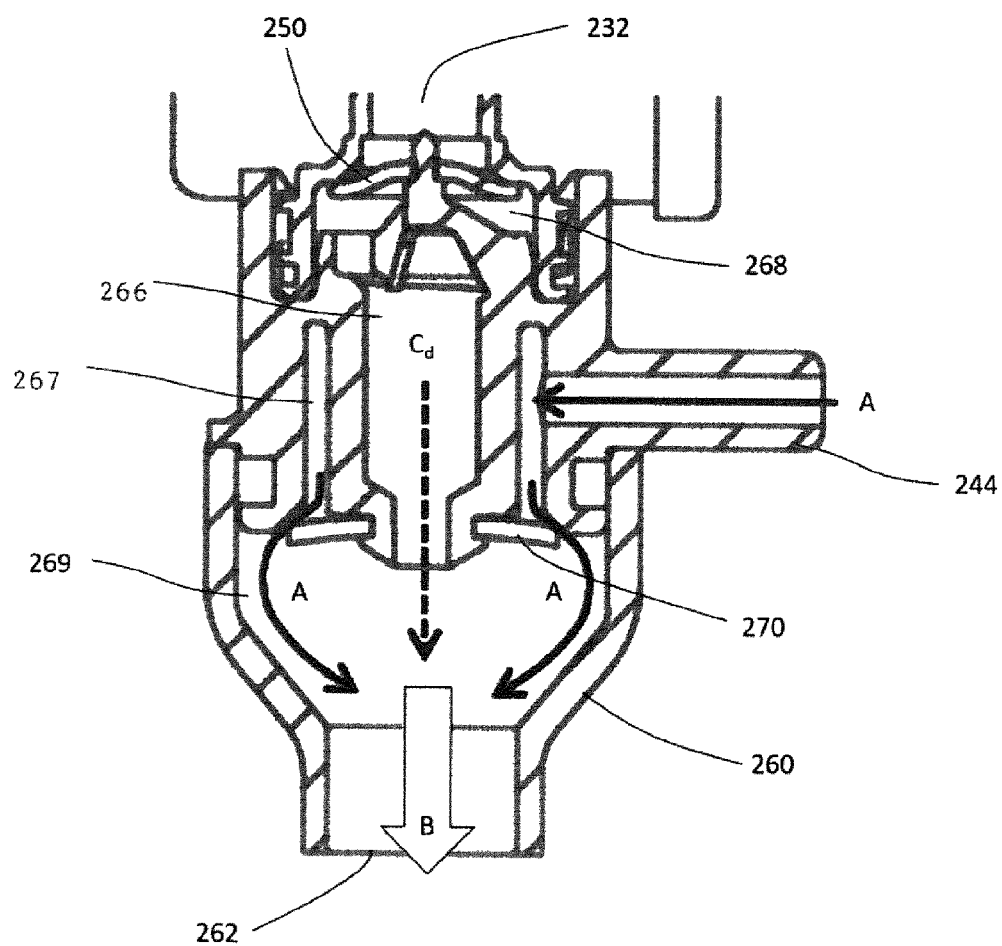
FIG. 3C shows a schematic cross-section view of the expanded region E indicated in FIG. 3B.

With reference to FIGS. 3A to 3C, an example dispenser head 200 may comprise a pump 220, a connection adapter 210 for connecting an inlet of the pump 220 in fluid communication with a vessel containing concentrate liquid C for a beverage, a dilution mechanism, an additive mechanism and a regulation system. The example dilution mechanism may comprise a dilution chamber 232 within a dilution housing 230, a diluent duct comprising a diluent inlet 234 and orifice 235 through which the diluent liquid D can pass into the dilution chamber 234, and a one-way diluent valve 250. The additive mechanism may comprise an additive housing 260, and additive inlet 244, an additive chamber including a first additive volume 268, a second additive volume 267, a third additive volume 266, a fourth additive volume 269 and an outlet nozzle 262 for dispensing beverage B. The additive housing 260 can be releasably coupled with the dilution housing 230 by means of a connection mechanism 238.

FIGS. 3B and 3C illustrate a particular example additive mechanism in more detail. Diluted concentrate fluid Cd (which may consist of diluted or undiluted concentrate liquid C) can pass from the dilution chamber 232, through a one-way valve 250 into the first volume 268 and subsequently through the second volume 266 towards the fourth volume 269 of the additive chamber. The second volume 266 includes a generally cylindrical volume extending longitudinally between the first volume 268 and the fourth volume 269; the fourth volume 269 being located adjacent the outlet nozzle 262. The third volume 267 of the additive chamber surrounds the second chamber 266, extending coaxially with the second chamber 266. Additive fluid A can be conveyed through the additive inlet 244 into the generally annular third volume 267 and distributed azimuthally around the second volume 266 conveying the diluted concentrate Cd, the second and third volumes 266, 267 being separated by a generally annular wall. A one-way additive valve 270 may be located between the third volume 267 and the fourth volume 269 such that the additive fluid A within the third volume 267 can pass into the fourth volume 269, but fluid cannot pass from the fourth volume 269 to the third volume 267. The one-way additive valve may comprise a flexible washer 270 and may operate similarly to the one-way valve 250 located upstream, through which the diluted concentrate Cd passes; that is, the pressure of the additive fluid A in the third volume 267 can deflect a peripheral portion of the flexible washer 270 away from a seat and pass between the flexible washer 270 and the seat. The additive fluid A can combine with the diluted concentrate Cd in the fourth volume 269 before being dispensed through the outlet nozzle 262.

Effervescible additive fluid A may be introduced into the second volume 266 of the additive chamber at a pressure of approximately 900 kPa, before flowing past the flexible washer 270 between the second volume 266 and the fourth volume 269. To reduce or substantially avoid premature or excessive effervescence of the additive liquid A (that is, to reduce nucleation of gas bubbles), the pressure of the effervescible liquid A should be decreased from the 900 kPa to ambient pressure as gently as possible. The flexible washer valve 270 may be conical in shape and its valve seat should be correspondingly conical; a preferred example cone angle may be approximately 45°. The diameter of the washer valve 270 may be relatively large so that the effervescible additive liquid A emerges from between the washer valve 270 and its seat in the form of a film having a relatively large cross-sectional area. In an example arrangement, the additive liquid A may strike the wall of the fourth volume 269 of the additive chamber at about 45°, and subsequently flow against the walls of the chamber. Since the diameter of the fourth volume 269 of the additive chamber is significantly larger than that of the additive inlet 244 (for example, an order of 15 times greater) the velocity of the effervescible liquid A is substantially less within the fourth volume 269 that it is in the additive inlet 244. In the illustrated example, the walls of the fourth volume 269 are conical (or funnel-shaped) towards the outlet nozzle 262 to converge the effervescible additive liquid A at a relatively low speed, forming a smooth, low speed stream.

The additive valve means 270 does not need to comprise a thermoplastic washer, and in some examples, it may comprise two concentric cones, between which there is a precise gap for the passage of the effervescible liquid A. However, a flexible washer may exhibit advantageous self-compensation for different flow rates; in addition, a double cone arrangement may need to be manufactured to a substantially higher precision than a flexible washer.

The diluted (and substantially homogeneous) concentrate liquid Cd within central second volume 266 of the additive chamber may be at a relatively low pressure so that it can combine in the fourth volume 269 with the effervescible additive liquid A, which is also at a relatively low pressure because the fourth volume 269 is open to ambient pressure. Further mixing of the diluted concentrate liquid Cd and the effervescible additive liquid A may occur within a receptacle into which the liquids are dispensed via the outlet nozzle 262. The outlet nozzle 262 may be fitted with a length of tube to direct the liquids to a receptacle some distance from the outlet nozzle 262.

With reference to FIGS. 4A to 5B, an example pressure-responsive flow control value assembly 282 may comprise a resilient annular valve body 284 and a valve holder 286, the valve body 284 including a central passage 288 connecting a proximal end 283 and a distal end 285 of the valve body 284 coaxially with a longitudinal axis L. The valve holder 286 is configured to accommodate the valve body 284, comprising a generally annular side wall 289 and having a seat 287 which the distal end 285 of the valve body 284 will abut when assembled as in use. The valve holder 286 includes a central exit passage 286E connecting the seat 287 to a distal end of the valve holder 286. In the particular example illustrated in FIG. 4A, the exit passage 286E is substantially coaxial with, and has a larger diameter than, the passage 288 through the valve body 284.

In use, liquid (for example, effervescible additive liquid A) will flow through the passage 288 of the valve body 284 from the proximal end 283 to the distal end 285, at least a radially outer area of which abuts the seat 287, and then exit the pressure-responsive valve assembly 282 through the exit passage 286E of the valve holder 286. When the additive mechanism 260 is assembled as in use, the valve holder 287 will be seated within the valve housing 280 (shown in FIG. 2D). The valve body 284 comprises or consists essentially of a flexible, resilient material and is configured such that it will flex longitudinally in response to an increase in the pressure of fluid against the proximal end 283. In an unflexed state, the distal end 285 of the valve body 282 in the particular example illustrated in FIG. 4A will be spaced apart from at least an inner annular area of the valve seat 287 so that when the valve body 284 flexes in response to the pressure of the fluid passing through the passage 288, its distal end 285 can flex towards the seat 285.

Figure 4A:
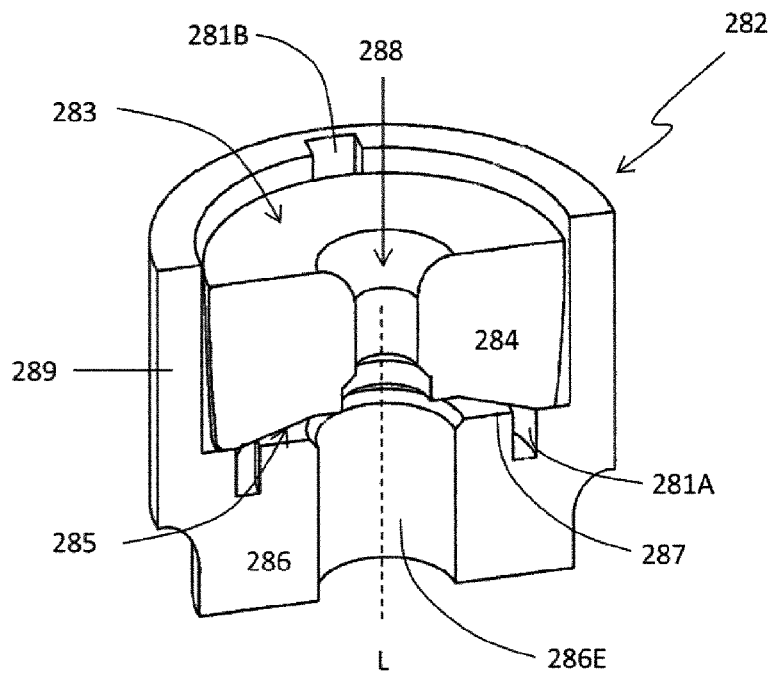
FIG. 4A shows a schematic longitudinal cross-section through an example flow rate regulator device, assembled as in use.
Figure 4B:
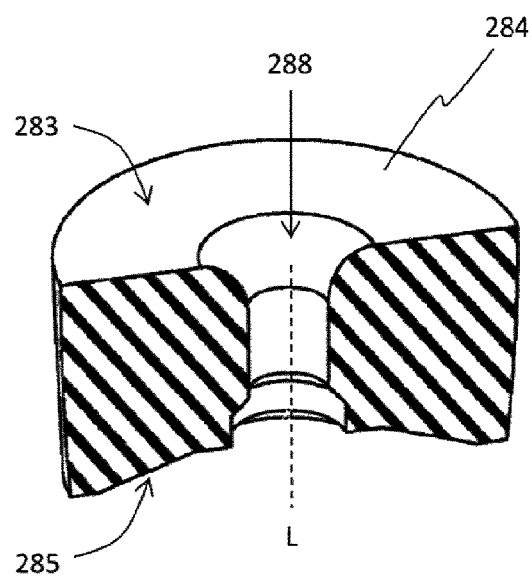
FIG. 4B shows a schematic longitudinal cross-section through an example valve body for the example flow rate regulator device in FIG. 3A.

In the particular example illustrated in FIG. 4A (disclosed in U.S. Pat. No. 7,225,829 B2), the valve holder further includes an annular bypass channel 281A formed into the valve seat 287 and coaxial with the exit passage 286E, and a longitudinal bypass channel inlet 281B, configured such that when the valve body 284 is unflexed as illustrated, fluid can flow through the bypass channel inlet 281B into the annular bypass channel 281A and then through the space between the spaced-apart inner distal end 285 of the valve body 284 and into the exit passage 286E. Thus, there is provided a bypass channel 281B, 281A through which fluid can pass when its pressure against the proximal end 283 of the valve body 284 is sufficiently low for the annular bypass channel 281A to be in fluid communication with the exit passage 286E of the valve holder 286. As the fluid pressure increases, the valve body 284 will flex such that its distal end 285 will move closer towards the inner area of the seat 285 and reduce the effective area of the bypass channel 281B, 281A. Consequently, the pressure-responsive valve assembly 282 will respond to an increase in fluid pressure by reducing the effective area through which the fluid can flow, thus counter-acting the tendency for the fluid flux to increase as its pressure increases. Other example pressure-responsive valve assemblies 282 have different configurations and arrangements of the valve body 284 and the valve housing 286.

The valve body 284 may comprise or consist essentially of flexible rubber material and is configured to deform in response to an increase in the pressure of the flowing fluid such that the effective passage diameter through the pressure-responsive valve assembly 282 will reduce in size, thus limiting the rate at which the fluid passes through it. As the fluid pressure increases above a certain value, the size of the aperture decreases just enough to maintain a substantially constant flow rate. An example of a potentially suitable pressure responsive valve may be VL3007XXXXX™, obtainable from Vernay®; other examples of potentially suitable pressure-responsive valves are disclosed in U.S. Pat. Nos. 4,609,014, 7,222,643 and 7,225,829.

In examples where the additive fluid is effervescible liquid, premature effervescence can be triggered by a number of factors. For example, the nucleation of gas bubbles can be caused by the presence of sharp edges and asperities, agitation of the effervescible liquid, an increase in the temperature of the effervescible liquid and a relatively rapid decrease in its pressure. A decrease in the pressure will result in a decrease in the saturation concentration of the dissolved gas to decrease, resulting in the formation of gas bubbles. Since the pressure of the effervescible additive liquid may be about 690 kPa when it is introduced into the additive chamber, it will need to decrease before being dispensed into a receptacle. To reduce premature effervescence, the decrease in pressure may be deferred until the effervescible liquid is as close as possible to the outlet nozzle of the additive mechanism. In addition, a rapid decrease in the pressure would tend to increase the agitation of the liquid. Preferably, the outlet nozzle may be kept at a relatively low temperature, by keeping the outlet nozzle within a refrigerated environment, for example. This reduces effervescence and may also be desirable for maintaining hygiene.

The capability of the pressure-responsive valve to reduce the variation in flow speed in response to a change in the pressure of the fluid may have the aspect of reducing the variation in effervescence (that is, frothing or foaming) of effervescible additive liquid A, were the pressure of the additive liquid A supplied by the supplemental fluid system may be uncertain, or differ between various systems. This effect may arise from a phenomenon in which increasing the flow speed of an effervescible liquid may directly or indirectly cause the liquid to effervesce, potentially as a result of an increased risk of turbulence within the flowing liquid.

The dispenser head 200 may be an assembly of parts, which may be provided assembled or in kit form, or separately-provided parts. For example, one or more of the valve housings 270, 280, flow control means 275, 285, and the pressure-responsive valve 282 may be provided as separate parts that can be assembled and functionally interconnected. Preferably, the dispenser head 200 is provided as a unitary construction. In addition, the additive housing 260 may be provided as a fixture that can be reversibly coupled to the dilution housing 230. The dispenser head 200 may comprise an attachment mechanism 238, formed of cooperatively configured end portions of the dilution housing 230 and the additive housing 260, such that the respective end portions can be inter-engaged with each other. For example, the end portions may be cooperatively threaded so that that the additive housing 260 can be screwed onto the end portion of the dilution housing 230; or inter-locked with it in some other way. In some examples, the additive mechanism may be provided as a kit comprising the additive housing 260, the additive valve housing 280, the pressure-responsive valve 282 and the shut-off valve 285.

By controlling the respective time periods over which the concentrate liquid C is pumped from the vessel 300, and the diluent and effervescible additive fluids D, A are allowed to flow into the dilution mechanism and the additive mechanism, respectively, to mix with the concentrate liquid C, a desired quantity of the beverage B having the desired concentration and carbonation or nitrogenation can be dispensed. In some examples, the pumping rate of the concentrate C, and/or the operation of the shut-off valve 275 for the diluent D and the shut-off valve 285 for the additive liquid A, and potentially other operating parameters of the pump 220, may be controlled by means of an RFID chip or QR code or similar that contains the recipe for that particular concentrate (not shown), which may be provided as part of the pump 220. The dispenser head 200 may contain a reader device that may be capable of reading the recipe of the beverage B and adjusting the ratios of the concentrate liquid C, the diluent liquid D and the additive liquid A according to the recipe.

The dispenser head 200 may include information about the liquid product for the user, and potentially information such as the quantity of concentrate remaining in the vessel 300, an expiry date (or "use-by" or "best-by") for the concentrate liquid C, the compatibility of the concentrate liquid with the dispenser head for the dispenser operator, which may be displayable on a graphic interface provided on or with the dispenser head 200. This arrangement is particularly advantageous when the dispenser head 200 is fitted to the concentrate vessel 300, for single use with only the concentrate vessel 300.

The electronic processor may be capable of receiving electronic input data indicative of the pumping rate and/or the diluent flux and/or the additive flux, and of the quantities of the concentrate C, diluent D and additive liquid A, and the quantity of the beverage B. The electronic processor may be capable of processing this data to determine at least the time periods for which the diluent D and/or additive are to flow into the dilution chamber 232 and/or additive chamber; and may control the operation of the shut-off valves 275, 285 independently from each other by outputting respective electronic control signals.

In some examples, a dispenser assembly including the dispenser head 200 may include a computer processor capable of reading radio-frequency identification devices (RFID) data and automatically setting operating parameters of the dispenser head, such as the respective timings of the opening and closing of the diluent and additive shut-off valves. At least some of the electronic input data may be entered manually by an operator or transmitted from sensors comprised in the pump means and/or the dilution mechanism and/or the additive mechanism; and/or transmitted by one or more devices such as RFID, which may be comprised in the supplemental fluid system 400, and/or provided with the concentrate vessel 300. In some examples, the dispenser head 200, which may include the concentrate vessel 300, or the concentrate vessel 300 specifically may be provided with a means of indicating the relative proportions of concentrate C, diluent D and additive A should be to provide a desired beverage B. For example, the dispenser head may include an RFID means capable of providing this information.

The concentrate liquid may be a concentrated form of any of a variety of beverages B, for example fruit juice, beer, milk, coffee, or soft drinks such as cola drinks. In some examples, the concentrate liquid C may be relatively viscous and need to be diluted before being mixed with carbonated or nitrogenated water (or other aqueous liquid) A to provide the beverage B with a desired carbonation or nitrogenation, whilst avoiding excessive foam or froth. The diluent liquid D may comprise or consist essentially of water (or other aqueous liquid) that is substantially free of added carbon dioxide or nitrogen in a form that can effervesce, and/or the additive fluid A may comprise or consist essentially of carbonated or nitrogenated water that can effervesce when combined into the beverage B. In some examples, the additive fluid A may be substantially free of carbon dioxide and nitrogen. In some examples, a certain amount of froth may be desirable (for example, in a coffee latte) in which case the additive mechanism may be configured to promote controlled nucleation.

A user may expect the beverage B to be dispensed into a cup or other receptacle within a relatively short period of time; for example, in about the time it would take to manually pour the beverage B directly into the cup. This requires the concentrate C to be diluted and carbonated as it flows from the pump through the outlet nozzle 262 and into the receptacle. In some examples, such as where the beverage B is apple juice or other fruit juice, the concentrate C may have a relatively high viscosity and needs to be diluted with diluent D before it can be effectively mixed with carbonated additive liquid A in a sufficiently short time period. A sufficient amount of diluent fluid D, such as still water, may be mixed into the juice concentrate C to sufficiently reduce the viscosity of the diluted concentrate Cd for carbonated water A to be mixed with it sufficiently quickly for convenient dispensing.

In some examples, the concentrate liquid C (for example concentrate syrup for a cola drink or beer) may have sufficiently low viscosity that it is not necessary to dilute it before combining it with carbonated or nitrogenated water or other aqueous liquid. In such cases, the diluent shut-off valve 275 may be kept in the closed state while the beverage B is being dispensed. For example, cola syrup may be mixed with carbonated water in a ratio of about 5:1; and for some alcoholic beers 4:1; and for some non-alcoholic beers, the ratio of concentrate to carbonated water may be about 25:1.

The supplemental fluid unit 400 may be configured to chill the water to about 2° C. and to pressurise it to about 700-1000 kPa just prior to being introduced into the dispenser head 200. Therefore, when the carbonated water A is introduced into the additive mechanism 260, the content of dissolved carbon dioxide should be close to the highest level that can be practically achieved.

The additive channel 430 transporting the carbonated liquid or nitrogenated liquid A may be configured to promote as laminar flow as possible to reduce or prevent effervescence until the carbonated fluid A is introduced into the additive mechanism 260. Laminar flow may be enhanced by configuring the additive duct 430 such that it changes direction gradually, without having abrupt corners.

Since carbon dioxide (or nitrogen) bubbles may nucleate and evolve in response to a decrease in pressure of the carbonated liquid A when it enters to the additive mechanism, the additive mechanism may be configured to provide a certain rate of depressurisation to control the rate of gas bubble formation and size distribution of the gas bubbles. The carbonated liquid A may be passed through a gauze as it flows into or through the additive mechanism to control the number and size distribution of bubbles and to promote controlled foaming of the beverage.

In some examples, when the dispenser head 200 is not being used, sanitising fluid may be introduced into the dilution or additive mechanism to clean at least a portion of the dispenser head 200 open to the environment. It may be desirable to use the diluent liquid to flush the outlet nozzle during mixing.

The supplemental fluid system may be capable of chilling the diluent liquid D and the additive fluid A to the same or different temperatures in the range of about 1° C. to about 10° C., and of pressurising at least the additive liquid A to a pressure of about 600 kPa to about 1000 kPa.

In some examples, the supplemental fluid system may be configured to introduce carbon dioxide or nitrogen gas bubbles into a carrier liquid such as water, which is to be carbonated or nitrogenated, and then treat the gas-containing carrier liquid such that substantially all the gas in the bubbles dissolves into or is suspended in the carrier liquid to provide the additive liquid that is capable of effervescing (that is, effervescible). The supplemental fluid system may reduce the temperature of the gas-containing carrier liquid to slightly greater than its freezing point by passing it through a heat exchanger, thus increasing the saturation solubility of the carbon dioxide or nitrogen within the carrier liquid. The diluent, which may be the same kind of liquid as the carrier liquid (for example, still water) may be passed through the same heat exchanger, which may be a twin-coil heat exchanger, to reduce its temperature as well, before the diluent and additive liquids D, A are supplied in separate streams at known flow rates into the diluent inlet 234 and the additive inlet 264, respectively. The pumped concentrate C may be aggressively mixed with the chilled diluent liquid D and thus rapidly diluted to produce diluted concentrate Cd having a sufficiently low viscosity for subsequent mixing with the chilled effervescible additive liquid A. The effervescible additive liquid A can then be relatively gently combined with the diluted concentrate Cd in the additive chamber and the effervescible beverage B dispensed directly into a cup without excessive frothing.

When introducing effervescible gas into carrier liquid to provide effervescible additive liquid within the supplemental fluid unit, the differential pressure between the gas (for example, carbon dioxide or nitrogen) and the water or other carrier liquid may generally be important for the effective and rapid dissolution of the gas into the carrier liquid. For example, if carbon dioxide gas is at a pressure of 700 kPA and the pressure of the water is 200 kPa, then the differentia pressure is 500 kPa. Once the water carrier liquid has been saturated with carbon dioxide, for example, the reduction in its pressure from 700 kPA should be as gradual as practically possible up to the point at which it is dispensed (at ambient pressure), to reduce the risk of excessive foaming. This may be achieved by conveying the effervescible liquid by means of a relatively long tube having a relatively small diameter, or which that is slightly tapered from a small diameter to a larger diameter so that at the flow rate of the liquid is relatively low where it is dispensed. A preferred method may be to convey the effervescible liquid in a relatively short tube having a relatively large diameter and to locate a flow control valve as close to the outlet nozzle as possible. Any dissolution of the gas as it passes through the flow control valve is immediately mixed with the concentrate liquid or a pre-diluted concentrate liquid. The concentrate liquid, having a higher density, can absorb a higher level of dissolved gas.

In general, if effervescible liquid is combined too aggressively with concentrate liquid, then excessive frothing or foaming may occur; the effervescible additive liquid should generally be subject to as little agitation as possible. Certain example dispenser heads have the aspect that the steps of aggressively diluting concentrate liquid C and gently combining it with effervescible liquid A are separated to provide an in-line means of sufficiently rapidly dispensing effervescible beverage B with reduced frothing. In addition, the supplemental fluid system 400 can be used to produce different beverages B from different respective concentrate liquids C, in which beverages B can be quickly switched with substantially reduced risk of cross-contamination. For example, a first assembly comprising the dispenser head connected to the vessel containing a first concentrate liquid can relatively easily and quickly be disconnected from the supplemental fluid system and replaced with a second assembly of dispenser head and vessel containing a second concentrate liquid.

In some examples, it may be desirable for the dispensed beverage to have a high degree of effervescence (that is, to be very 'fizzy'), requiring a relatively large quantity of effervescible liquid to be combined with concentrate liquid. In general, the higher the concentration of the concentrate liquid, the more effervescence can be introduced in-line; and in general, the more concentrated the concentrate liquid, the higher its viscosity and the more it may need to be diluted. In general, since the desirable serving temperature of chilled beverages may be approximately 8° C. (5-10° C.), and the concentrate liquid C may be stored in a refrigerated compartment at approximately 6° C., and since the cup is likely to be at ambient temperature (about 15-30° C.), the supplemental fluid unit may need to introduce the diluent liquid at a temperature close to its freezing point; for example, about 2° C. for water diluent. The effervescible additive liquid may include the highest possible content of dissolved effervescent gas.

In some examples, the ratio of concentrate liquid to still water diluent may be about 1:1; and the ratio of effervescible water to the diluted concentrate may be about 4:1.

The viscosity of the diluted concentrate may be sufficiently low that the final stage of mixing of the effervescible additive liquid and the diluted concentrate can take place in the cup, after being dispensed.

For a given pressure differential between the gas and liquid, a given temperature and a given time, the maximum saturation level is a constant value. The dispenser head may be capable of using this known constant value to dispense the correct ratios of concentrate, diluent and saturated carbonated water.

Some example dispenser heads may have the aspect of avoiding concentrate being supplied by the supplemental fluid unit, which may produce, chill and/or pressurise, and convey only diluent fluid such as still water and/or additive fluid such as carbonated or nitrogenated water. A dispenser head, comprising or connected to a concentrate vessel, can be connected to the supplemental fluid unit such that the diluent and/or the additive fluids can be conveyed from the supplemental fluid unit into the dispenser head. The type of beverage to be dispensed can be changed by disconnecting the dispenser head from the supplemental fluid unit and attaching a different dispenser head that is attached or attachable to a vessel containing a different concentrate liquid that is suitable for the desired beverage. Alternatively, the concentrate vessel may be detached from the pump and a different vessel, containing a desired concentrate, can be connected to the pump. This avoids the need to clean the supplemental fluid unit to remove residual concentrate and avoids cross-contamination of the desired beverage by a residual amount of a previous concentrate. An example dispenser head may be configured such that a source of sanitising liquid can be connected with the diluent inlet for introducing the sanitising fluid in such a way that it will flow through all passageways downstream of the pump outlet.

Example dispenser heads which are provided attached to the concentrate vessel may have the aspect of avoiding the risk of cross-contamination of different concentrates that may arise if the pump assembly were used for pumping different concentrates. In other examples, the dispenser head may be provided separately from the concentrate vessel, to which it may be attached for use and subsequently detached for use with a different vessel containing a concentrate of the same or a different kind. The pump assembly may be cleaned before attaching it to a concentrate vessel for use.

The invention claimed is:

1. A dispenser head comprising:
   a pump comprising a pump housing that defines a pump inlet and a pump outlet;
   a dilution chamber defined between a housing of the dispenser head and the pump housing, where an inlet to the dilution chamber is in fluid communication with the pump outlet;
   an additive housing extending from an outlet of the dilution chamber, the additive housing defining an additive chamber that is separated from the dilution chamber by a valve positioned between the outlet of the dilution chamber and an inlet to the additive chamber, where the valve comprises a flexible member that abuts the housing of the dispenser head and the pump housing when in a closed state; and
   an outlet nozzle in fluid communication with the additive chamber and defined by edges of the additive housing.

2. The dispenser head of claim 1, wherein the flexible member is radially symmetric and applies a radial force to liquid as the liquid passes from the dilution chamber to the additive chamber.

3. The dispenser head of claim 1, wherein the additive chamber comprises a first volume and a second volume downstream of the first volume and in fluid communication with the first volume, and the first volume is configured to direct fluid passing from the valve to a center region of the first volume.

4. The dispenser head of claim 3, wherein the first and second volumes are substantially free of corners or abrupt changes in direction.

5. The dispenser head of claim 3, wherein the additive chamber comprises a third volume surrounding the second volume and extends coaxially with the second volume.

6. The dispenser head of claim 5, wherein:
   the third volume is annular,
   the second and third volumes are configured such that an additive fluid is distributed azimuthally around the second volume, and
   an annular wall separates the second and third volumes.

7. The dispenser head of claim 5, wherein the additive chamber comprises a fourth volume located adjacent to the outlet nozzle.

8. The dispenser head of claim 7, further comprising a one-way valve disposed between the third and fourth volumes, the one-way valve configured such that a fluid within the third volume can flow into the fourth volume, but the fluid cannot pass from the fourth volume to the third volume.

9. The dispenser head of claim 7, wherein second volume is cylindrical and extends longitudinally between the first volume and the fourth volume.

10. The dispenser head of claim 1, wherein the inlet to the dilution chamber is upstream of the pump outlet.

11. The dispenser head of claim 1, further comprising a regulation system comprising:
    a pump regulator for regulating a flow rate of concentrate liquid pumped into the dilution chamber;
    a diluent quantity regulator for regulating a flow rate of diluent liquid that flows into the dilution chamber; and
    an additive quantity regulator for regulating a flow rate of additive fluid that flows into the additive chamber, wherein the additive quantity regulator is configured such that the flow rate of the additive fluid when a pressure of the additive fluid is 1000 kPa is no more than 110% of the flow rate of the additive fluid when the pressure of the additive fluid in an additive source is 600 kPa.

12. The dispenser head of claim 11, wherein the regulation system comprises a processor configured for:
    receiving input data indicative of a quantity of a liquid product to be dispensed, and
    issuing control signals operable to control at least one respective operating parameter of each of the diluent quantity regulator and the additive quantity regulator and to dispense the quantity of the liquid product.

13. The dispenser head of claim 1, wherein the pump comprises:
    a rotor housed within a pump housing, the rotor configured such that the rotor can be driven to rotate within the pump housing operable to transport concentrate liquid from the pump inlet in fluid communication with a concentrate source and to the pump outlet in fluid communication with the dilution chamber; and
    a seal member bearing against the rotor operable to prevent concentrate liquid from passing from the pump outlet to the pump inlet and to expel concentrate liquid into the pump outlet.

14. The dispenser head of claim 13, wherein the pump further comprises a resilient compression member located within a rear chamber behind the seal member opposite a side of the seal member that contacts the rotor.

15. The dispenser head of claim 1, wherein the additive chamber comprises is configured to include nucleation sites for promoting formation of gas bubbles.

16. The dispenser head of claim 1, further comprising an additive disperser for dispersing an additive fluid within the additive chamber,
    wherein the additive disperser is configured such that the additive fluid will be dispersed before being combined with a diluted concentrate liquid.

17. The dispenser head of claim 1, further comprising a coupling mechanism for reversibly connecting the additive housing to the housing of the dispenser head such that when the additive housing is connected to the housing of the dispenser head by the coupling mechanism, diluted concentrate liquid can flow from the housing of the dispenser head into the additive housing.

18. The dispenser head of claim 1, wherein the pump, the housing of the dispenser head, the additive housing and the outlet nozzle form of a unitary device.

19. The dispenser head of claim 1, wherein the additive housing is releasably coupled with housing of the dispenser head.

20. The dispenser head of claim 1, wherein the dispenser head is a beverage dispenser head.

21. A dispenser head comprising:
- means for moving fluid through the dispenser head, the means comprising a housing means that defines a housing means inlet and a housing means outlet;
- a dilution chamber defined between a dispenser head housing of the dispenser head and the housing means, where an inlet to the dilution chamber is in fluid communication with the housing means outlet;
- an additive housing extending from an outlet of the dilution chamber, the additive housing defining an additive chamber that is separated from the dilution chamber by a valve positioned between the outlet of the dilution chamber and an inlet to the additive chamber, where the valve comprises a flexible member that abuts the dispenser head housing and the housing means when in a closed state; and
- an outlet nozzle in fluid communication with the additive chamber and defined by edges of the additive housing.

* * * * *